(12) United States Patent
Wang et al.

(10) Patent No.: US 11,736,423 B2
(45) Date of Patent: Aug. 22, 2023

(54) AUTOMATED CONVERSATIONAL RESPONSE GENERATION

(71) Applicant: International Business Machines Corporation, Armonk, NY (US)

(72) Inventors: Dakuo Wang, Cambridge, MA (US); Mo Yu, White Plains, NY (US); Chuang Gan, Cambridge, MA (US); Bo Wu, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/307,175

(22) Filed: May 4, 2021

(65) Prior Publication Data

US 2022/0377028 A1    Nov. 24, 2022

(51) Int. Cl.
*G06F 15/16* (2006.01)
*H04L 51/04* (2022.01)
(Continued)

(52) U.S. Cl.
CPC ............ *H04L 51/04* (2013.01); *G06F 11/302* (2013.01); *G06F 18/2178* (2023.01); *G06F 40/30* (2020.01)

(58) Field of Classification Search
CPC ........ H04L 51/04; G06F 40/30; G06F 11/302; G06K 9/6263
(Continued)

(56) References Cited

U.S. PATENT DOCUMENTS 7,814,048 B2   10/2010  Zhou et al.
10,116,596 B2  10/2018  Li et al.
(Continued)

FOREIGN PATENT DOCUMENTS

KR   20190134053   12/2019
KR     102204979    3/2020

OTHER PUBLICATIONS

Wang et al., "CASS: Towards Building a Social-Support Chatbot for Online Health Community," arXiv:2101.01583v3 [cs.HC], Feb. 4, 2021, 31 pages.
(Continued)

*Primary Examiner* — Alan S Chou
(74) *Attorney, Agent, or Firm* — Amin, Turocy & Watson, LLP

(57) ABSTRACT

Systems, computer-implemented methods, and/or computer program products facilitating a process to identify and respond to a primary electronic message are provided. According to an embodiment, a system can comprise a memory that stores computer executable components and a processor that executes the computer executable components stored in the memory. The computer executable components can include a determination component can determine that a primary electronic message has not received a response electronic message. An analysis component can generate a generated electronic message addressing the informational or emotional content of the primary electronic message. In one or more embodiments, an updating component can update the analytical model based on one or more feedbacks to the generated electronic message, where the analytical model can remain active while being updated. The one or more feedbacks can comprise a feedback from an entity-in-the-loop monitoring outputs of the analytical model including the generated electronic message.

21 Claims, 11 Drawing Sheets

(51) Int. Cl.
   *G06F 11/30*    (2006.01)
   *G06F 40/30*    (2020.01)
   *G06F 18/21*    (2023.01)
(58) Field of Classification Search
   USPC ........................................................ 709/206
   See application file for complete search history.

(56) References Cited

U.S. PATENT DOCUMENTS

| | | | |
|---|---|---|---|
| 10,332,033 | B2 | 6/2019 | Kwon et al. |
| 10,394,853 | B2 | 8/2019 | Porter |
| 10,599,885 | B2 | 3/2020 | Galitsky |
| 10,601,740 | B1 | 3/2020 | Harding et al. |
| 10,701,542 | B2 | 6/2020 | Martin et al. |
| 10,762,305 | B2 | 9/2020 | Liu et al. |
| 10,977,258 | B1* | 4/2021 | Liu ................... H04L 43/0894 |
| 2016/0063874 | A1* | 3/2016 | Czerwinski ............ G16H 50/20 434/236 |
| 2016/0247068 | A1 | 8/2016 | Lin |
| 2017/0024540 | A1* | 1/2017 | Han ....................... G16H 15/00 |
| 2017/0160903 | A1* | 6/2017 | Fernéndez .............. G06F 40/10 |
| 2018/0025726 | A1 | 1/2018 | de Bayser et al. |
| 2018/0063262 | A1* | 3/2018 | Balasubramanian ........................ G06F 40/253 |
| 2020/0213405 | A1* | 7/2020 | Goenka ................... H04L 67/22 |
| 2020/0344187 | A1 | 10/2020 | D'Agostino et al. |
| 2021/0158458 | A1* | 5/2021 | Waldrop ................. G06F 40/30 |
| 2022/0114344 | A1* | 4/2022 | Chopdekar ............. H04L 51/14 |

OTHER PUBLICATIONS

Gui et al., "Investigating Support Seeking from Peers for Pregnancy in Online Health Communities," Conference: the 2018 ACM conference on Computer-Supported Cooperative Work and Social Computing, Nov. 2018, 20 pages.

Seering et al., "It Takes a Village: Integrating an Adaptive Chatbot into an Online Gaming Community," CHI '20: CHI Conference on Human Factors in Computing Systems, Apr. 2020, 14 pages.

Zhang et al., "Classifying User Intention and Social Support Types in Online Healthcare Discussions," IEEE International Conference on Healthcare Informatics, Sep. 2014, 10 pages.

Zhou et al., "The Design and Implementation of Xiaolce, an Empathetic Social Chatbot," arXiv:1812.08989v2 [cs.HC] Sep. 14, 2019, 35 pages.

Yang et al., "Seekers, Providers, Welcomers, and Storytellers: Modeling Social Roles in Online Health Communities," CHI 2019, May 4-9, 2019, 14 pages.

Weizenbaum, "ELIZA A Computer Program for the Study of Natural Language Communication Between Man and Machine," Communications of the ACM, vol. 9, No. 1, Jan. 1966, 10 pages.

Wang et al., ""Brilliant AI Doctor" in Rural China: Tensions and Challenges in AI-Powered CDSS Deployment," arXiv:2101.01524V2 [cs.HC] Jan. 12, 2021, 18 pages.

Wang et al., "Answerer Engagement in an Enterprise Social Question & Answering System," iConference 2016, 11 pages.

Xu et al., "Same benefits, different communication patterns: Comparing Children's reading with a conversational agent vs. a human partner," Computers & Education 161 (2021), 104059, 18 pages.

Fan et al., "Utilization of Self-Diagnosis Health Chatbots in Real-World Settings: Case Study," J Med Internet Res 2021;23(1):e19928, 16 pages.

Terveen et al., "Study, Build, Repeat: Using Online Communities as a Research Platform," J.S. Olson and W.A. Kellogg (eds), Ways of Knowing in HCI, Springer-Verlag New York, 2014, 23 pages.

Robert et al., "Designing Fair AI for Managing Employees in Organizations: A Review, Critique, and Design Agenda," Human-Computer Interaction, Feb. 2020, 32 pages.

Mell et al., "The NIST Definition of Cloud Computing," Recommendations of the National Institute of Standards and Technology, NIST Special Publication 800-145, Sep. 2011, 7 pages.

\* cited by examiner

AUTOMATED CONVERSATIONAL RESPONSE GENERATION

BACKGROUND

One or more embodiments herein relate generally to identifying and responding to a primary electronic message, and more specifically, to generating a generated electronic message addressing the informational or emotional content of the primary electronic message, where the primary electronic message has met one or more criterion for failing to receive a response electronic message.

In today's world, electronic means of communication continue to expand and take a large part in daily interactions. Sometimes at the expense of lost personal, voice-based or video-based interaction, usage of text-based communication on electronic messaging platforms continues to increase. These electronic message platforms can include, but are not limited to, social network platforms, blogs, text messaging applications, chat rooms, anonymous posting sites and/or other similar systems. Often, a user can utilize one of these types of electronic messaging platforms as an only means of communication with certain other persons or groups. Likewise, a user can utilize one of these types of electronic messaging platforms as an only means of communication about one or more certain subjects. In an example, a user can feel uncomfortable talking directly to others about a topic. Instead, the user can feel more comfortable talking about the topic via text-based communication, whether representing themselves by their name, picture, some other alias and/or anonymously. This can often be the case when discussing with emotional and/or sensitive issues.

For one or more of these reasons, automatic chatbot systems have been increasingly adopted in many fields such as healthcare, human resources and/or customer service. That is, where another user entity is not available to converse with a poster entity via electronic message, a chatbot system can instead provide one or more generated electronic messages. As used herein, the terms "entity," "user entity" and/or "poster entity" can be or include a machine, device, component, hardware, software, smart device or, in some embodiments, a human. Generally, a chatbot can use neural-network (NN) or deep neural-network (DNN) based approach to understand text and provide one or more responses, such as generated electronic messages, generally based on a rule-based selection process. Because of an employed rule-based dialog limit, current chatbots typically can respond only to a limited number of defined inputs (e.g., content of electronic messages from a user) with previously scripted responses. Accordingly, it can be difficult for a user having posted and/or submitted an electronic message to understand and/or to continue to converse with a current chatbot.

Further, such current chatbots are single-user response systems that focus on responding to a single user. Effect of the responses in a multi-user dialog setting, such as a chat room, are not considered. This lack of consideration of effect of the responses can be exacerbated in electronic messaging platforms where emotional and/or sensitive issues are being discussed. The lack of multi-user-focus can be due to responses from others not being considered. Thus, the chatbot inherently can be unable to consider the situation, issues and/or needs of other users submitting and/or posting on the respective electronic messaging platform. Additionally and/or alternatively, this lack of consideration can be exacerbated be because a user discussing such emotional and/or sensitive issues can be sensitive to electronic messages submitted and/or posted by a chatbot or by other users.

With further respect to lack of multi-user-focus, current chatbots do not take into consideration the capacity to drive users to respond to the electronic messages of other users. That is, a primary electronic message submitted and/or posted by a user often can go unanswered, such as where a response electronic message to the primary electronic message is not received. It will be appreciated that where emotional and/or sensitive issues are being discussed, directly and/or indirectly, a lack of receipt of a response electronic message can be detrimental. This detriment can be to the user directly, such as to an emotional state, and/or to the continued use of the respective electronic messaging platform by one or more users.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate a process to identify and respond to a primary electronic message.

According to an embodiment, a system can comprise a memory that stores computer executable components and a processor that executes the computer executable components stored in the memory. The computer executable components can include a determination component that determines that a primary electronic message has not received a response electronic message. The computer executable components also can include an analysis component that generates a generated electronic message addressing the informational or emotional content of the primary electronic message.

According to another embodiment, a computer-implemented method can comprise determining, by a system operatively coupled to a processor, that a primary electronic message has not received a response electronic message. The computer-implemented method further can comprise generating, by the system, a generated electronic message addressing the informational or emotional content of the primary electronic message.

According to yet another embodiment, a computer program product, facilitating a process to identify and respond to a primary electronic message, can comprise a computer readable storage medium having program instructions embodied therewith. The program instructions can be executable, by a processor of a system, to cause the processor to determine that a primary electronic message has not received a response electronic message. The program instructions can further be executable, by the processor, to cause the processor to generate, by the processor, a generated electronic message addressing the informational or emotional content of the primary electronic message.

An advantage of such system, computer program product and/or method can be recognition of unanswered electronic messages and/or a response better directed to the underlying intent (e.g., informational or emotional) of the poster entity of the primary electronic message. In turn, such system, computer program product and/or method can enhance the experience of the poster entity with the respective electronic messaging platform. Further, enhanced experience can lead to increased usage of the electronic messaging platform by the poster entity and by another entity, such as those to which the poster entity recommends the electronic messaging platform.

In one or more embodiments of the above system, computer program product and/or method, an updating component updates the analytical model based on one or more feedbacks to the generated electronic message, where the analytical model remains active while being updated. The one or more feedbacks can comprise a feedback from an entity-in-the-loop monitoring outputs of the analytical model including the generated electronic message. An advantage of such systems, computer program products and/or methods can be iterative training of the analytical model, and in one or more cases, experience-based iterative training of the analytical model. That is, an entity-in-the-loop can provide feedback that can be based on experience with interaction(s) and/or emotion(s), such as to provide a verification prior to posting of the generated electronic message. Updating the analytical model while it remains active can allow for rapid improvements and/or changes in accuracy, coherency, applicability and/or acceptability of the analytical model, and thus also for future generated electronic messages.

According to still another embodiment, a system can comprise a memory that stores computer executable components and a processor that executes the computer executable components stored in the memory. The computer executable components can include a determination component that determines that a primary electronic message has not received a response electronic message. The computer executable components further can include an analysis component that generates a generated electronic message addressing the content of the primary electronic message. The computer executable components further can include a monitoring component that can enable entity-in-the-loop feedback to the generated electronic message.

An advantage of such system can be experience-based iterative training of the analytical model. An entity-in-the-loop (EITL) can provide accurate feedback and/or change a generated electronic message before it is posted, such as to a thread including the primary electronic message. The feedback provided by the EITL can be based on experience with interaction(s) and/or emotion(s).

In one or more embodiments of the above system, the computer executable components further can include an updating component that updates an analytical model in response to the entity-in-the-loop feedback. The analytical model can remain active while being updated. An advantage of such system can be that updating the analytical model while it remains active can allow for rapid improvements and/or changes in accuracy, coherency, applicability and/or acceptability of the analytical model.

According to still another embodiment, a system can comprise a memory that stores computer executable components and a processor that executes the computer executable components stored in the memory. The computer executable components can include a determination component that determines that a primary electronic message has not received a response message. The computer executable components can further include an updating component that updates an analytical model at least partially in response to entity-in-the-loop feedback applied to a generated electronic message in response to the primary electronic message.

An advantage of such system can be experience-based iterative training of the analytical model. An entity-in-the-loop (EITL) can provide feedback that can be based on experience with interaction(s) and/or emotion(s). Updating the analytical model can allow for improvements and/or changes in accuracy, coherency, applicability and/or acceptability of the analytical model based on such experience.

In one or more embodiments of the above system, the updating component can further update the analytical model at least partially in response to a response electronic message posted or uploaded subsequent to the determination by the determination component. An advantage of such system can be rapid iterative training of the analytical model employing third party feedback. That is, the response electronic message can be posted and/or uploaded by a third party entity. This feedback can be applicable to the effectiveness of the generated electronic message and/or as historical data relative to the primary electronic message.

DETAILED DESCRIPTION

Figure 1:
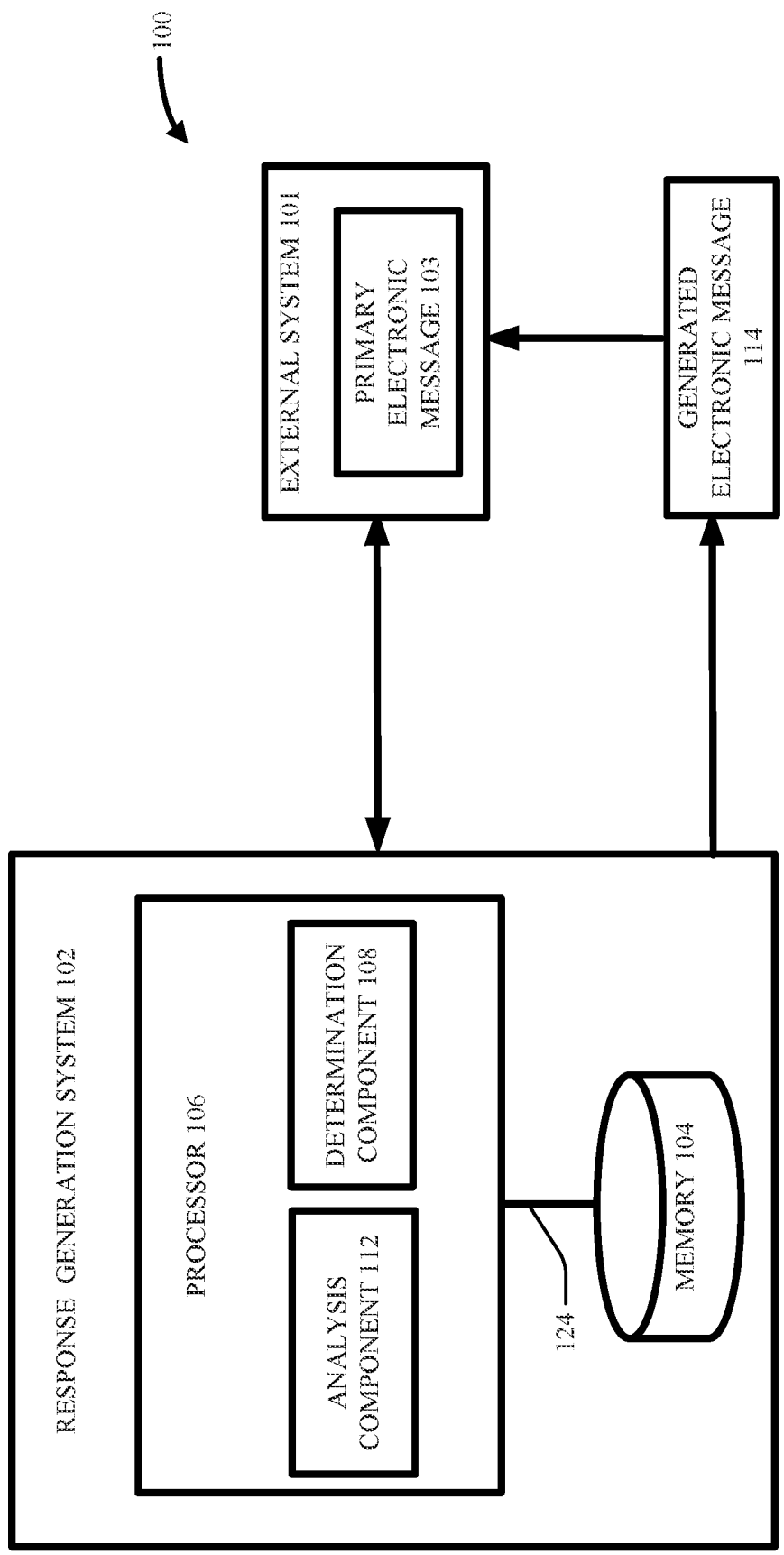
FIG. 1 illustrates a block diagram of an example, non-limiting system that can facilitate a process to identify and respond to a primary electronic message, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

As discussed above, current chatbot systems, or more generally, current electronic messaging platforms, can suffer from one or more drawbacks. These drawbacks can include, but are not limited to, having a limited number of defined inputs (e.g., content of electronic messages from a user) with previously scripted responses, and generally being single-user response systems that focus on responding to a single user, such as without consideration of effect on other users.

In view of these one or more drawbacks, one or more embodiments described herein can be implemented to produce a solution in the form of systems, computer-implemented methods, and/or computer program products that can facilitate a process to identify and respond to a primary electronic message. The systems, computer-implemented methods, and/or computer program products also can facilitate implementing entity-in-the-loop feedback into one or both of the generated electronic message provided and the updating, such as training, of a respective analytical model facilitating the generation of the generated electronic message. That is, generally, one or more embodiments described herein can provide a generalizable chatbot architecture to respond to, automatically detect and classify posts from an electronic messaging platform, and to use an informational retrieval and/or generative model to automatically respond to informational or emotional content of the posts employing a chatbot format.

Put another way, one or more embodiments described herein can facilitate locating a primary electronic message lacking receipt of a response electronic message, classification of the primary electronic message as seeking informational support or emotional support, generation of an informational support or emotional support generated electronic message, enablement of entity-in-the-loop (EITL) feedback to the generated electronic message, and/or updating an analytical model generating the generated electronic message with feedback based on the EITL or based on a response electronic message provided by a third party entity, such as in response to the generated electronic message. The updating, also referred to herein as reinforced learning (RL), can be provided at least rapidly, while the analytical model is still active, such as being updated in real-time.

The EITL feedback can enable the chatbot system to function as a full experience-centered artificial intelligence (AI), such as an AI that takes into consideration the impact of the respective analytical model(s) and/or an algorithm(s) on the experience had by a user entity of the chatbot system. This can be the case whether the user entity has provided the primary electronic message to which the chatbot system is responding, or if the user entity is instead a third party entity viewing a thread including the primary electronic message.

One or more algorithms employed by the analytical model can be based on one or more, or all, of the following: ease of answering, information flow and semantic coherence. As used herein, ease of answering refers to the availability of numerous different responses to a primary electronic message without providing a dull or non-helpful response. As used herein, information flow refers to the promotion of continued posting of electronic messages either by the primary user or by third parties also employing the chatbot system, such as where multiple users have visual and/or posting access to the thread of responses. As used herein, semantic coherence refers to a response being grammatical and/or coherent.

In one or more other embodiments, accuracy, applicability and/or acceptability can be taken into account, such as in the one or more algorithms employed by the analytical model. As used herein, accuracy refers to how well the content of the generated electronic message directly responds to the primary electronic message. As used herein, applicability refers to how well the content of the generated electronic message applies to the general subject matter of the content of the primary electronic message. As used herein, acceptability refers to how acceptable (e.g., subjectively acceptable) the generated electronic message is to the poster entity of the primary electronic message, or to other users viewing the associated thread.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200, 300 and/or 400 illustrated at FIGS. 1 to 4, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1 to 4 and/or with other figures described herein.

Turning now in particular to one or more figures, and first to FIG. 1, the figure illustrates a block diagram of an example, non-limiting system 100 that can facilitate a process to identify and respond to a primary electronic message, in accordance with one or more embodiments described herein.

The non-limiting system 100 can comprise a response generation system 102, which can be associated with a cloud computing environment. The non-limiting system 100 can comprise one or more components, such as a memory 104, processor 106, bus 124, determination component 108 and/or analysis component 112. Generally, response generation system 102, and thus non-limiting system 100, can facilitate a process to identify and respond to a primary electronic message 103.

As illustrated, the primary electronic message 103 can be submitted and/or posted at a system external to the response generation system 102 (e.g., at external system 101). In one or more other embodiments, the primary electronic message 103 alternatively can be submitted at the response generation system 102, where suitable. The external system 101 can be any suitable machine that can enable access to and/or run at least a portion of an electronic messaging platform for the submission and/or posting of one or more electronic messages. As used herein, the machine can be and/or can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet-enabled phone and/or another type of device. Although not shown, the external system 101 can include a respective memory and processor. In the illustrated embodiment, the non-limiting system 100 includes the external system 101. Alternatively, the external system 101 can be external to, but accessible by, the non-limiting system 100.

The determination component 108 can determine that the primary electronic message 103 has not received a response electronic message, such as from a third party entity. The determination can be based on any suitable default and/or selectively determined criterion, such as a time-based criterion. It will be appreciated that it can be generally determined that a response electronic message has not been received in response to the primary electronic message 103 from a user entity.

The analysis component 112 can generate a generated electronic message 114 addressing content of the primary electronic message 103. For example, the analysis component 112 can particularly address informational and/or emotional content of the primary electronic message 103. As used herein, informational content can include informational support seeking content. Also as used herein, emotional content can include emotional support seeking content.

Accordingly, the one or more processes to be performed by the response generation system 102 can provide recognition of unanswered electronic messages and/or a response directed to the underlying intent (e.g., informational or emotional) of the poster entity of the primary electronic message 103. In turn, the response generation system 102 can enhance the experience of the poster entity with the respective electronic messaging platform, which also can lead to increased usage of the electronic messaging platform and thus additionally of the response generation system 102. This increased usage can be by the poster entity, another user entity and/or potential user entity.

It also will be appreciated that employment of the response generation system 102 is not limited to a single user and/or to a single primary electronic message. Rather, use of the response generation system 102 can be scalable, such as where the response generation system 102 can identify and/or respond to one or more primary electronic messages, such as at least partially in parallel.

Figure 2:
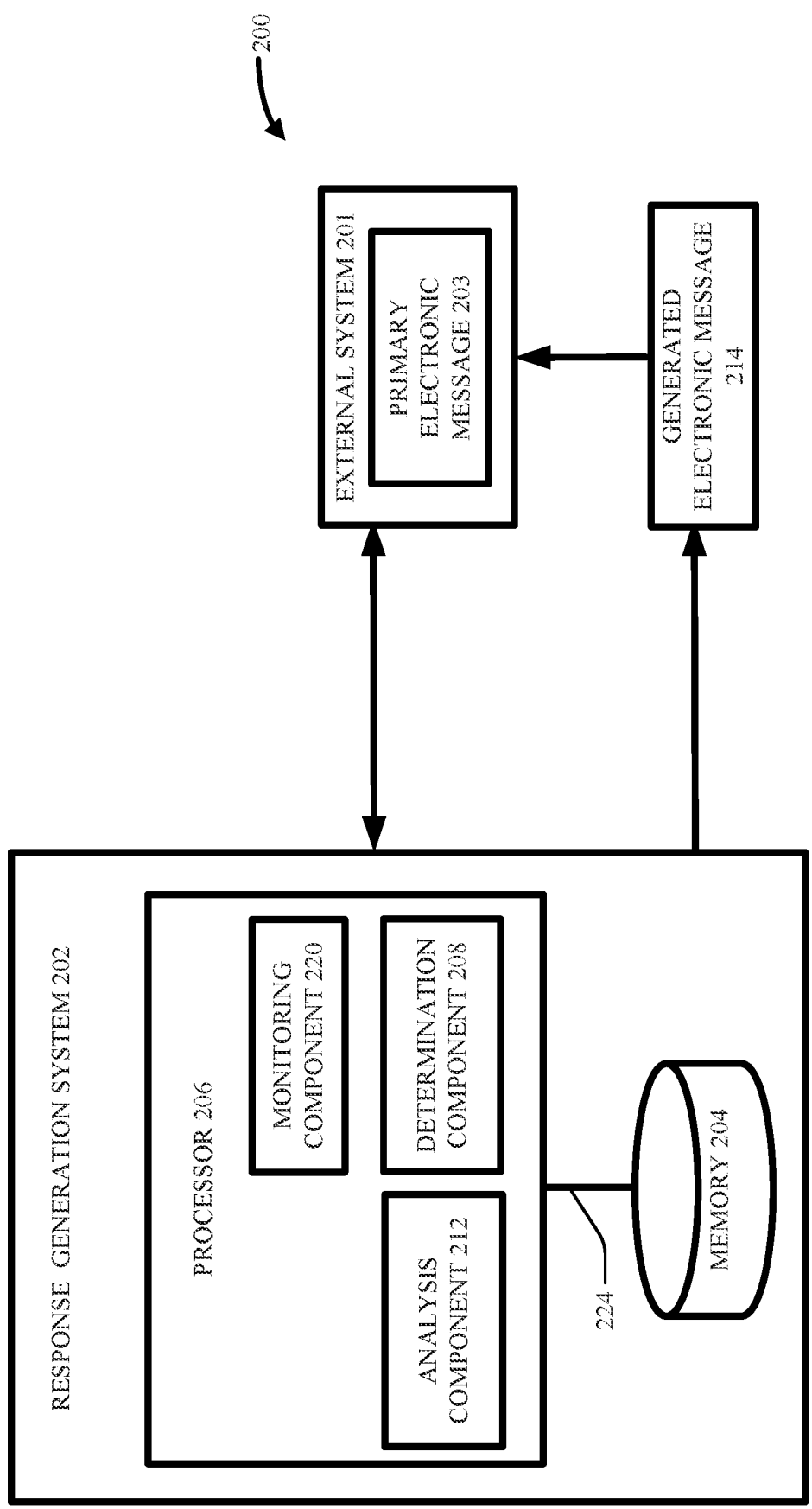
FIG. 2 illustrates another block diagram of an example, non-limiting system that can facilitate a process to identify and respond to a primary electronic message, in accordance with one or more embodiments described herein.

Turning next to FIG. 2, the figure illustrates a block diagram of an example, non-limiting system 200 that can facilitate a process to identify and respond to a primary electronic message, in accordance with one or more embodiments described herein.

The non-limiting system 200 can comprise a response generation system 202, which can be associated with a cloud computing environment. The non-limiting system 200 can comprise one or more components, such as a memory 204, processor 206, bus 224, determination component 208, analysis component 212 and/or monitoring component 220. Generally, response generation system 202, and thus non-limiting system 200, can facilitate a process to identify and respond to a primary electronic message 203.

As illustrated, the primary electronic message 203 can be submitted and/or posted at a system external to the response generation system 202 (e.g., at external system 201). In one or more other embodiments, the primary electronic message 203 alternatively can be submitted at the response generation system 202, where suitable. The external system 201 can be any suitable machine that can enable access to and/or run at least a portion of an electronic messaging platform for the submission and/or posting of one or more electronic messages. As used herein, the machine can be and/or can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet-enabled phone and/or another type of device. Although not shown, the external system 201 can include a respective memory and processor. In the illustrated embodiment, the non-limiting system 200 includes the external system 201. Alternatively, the external system 201 can be external to, but accessible by, the non-limiting system 200.

The determination component 208 can determine that the primary electronic message 203 has not received a response electronic message, such as from a third party entity. The determination can be based on any suitable default and/or selectively determined criterion, such as a time-based criterion. It will be appreciated that it can be generally determined that a response electronic message has not been received in response to the primary electronic message 203 from a user entity.

The analysis component 212 can generate a generated electronic message 214 addressing content of the primary electronic message 203. The monitoring component 220 can enable entity-in-the-loop feedback (EITL) to the generated electronic message 214, such as via an interface communicatively connected to the response generation system 202. In one example, an entity can provide the EITL employing any suitable communicative connection to the monitoring component 220 and/or response generation system 202 to thereby monitor and/or to input information relative to the generated electronic message 214. In another example, the entity can be a human that can provide human-in-the-loop feedback utilizing a tablet, screen, keyboard, mouse or other input device to thereby monitor and/or to input information relative to the generated electronic message 214.

Turning back to entities, in general, the EITL feedback can include one or more of an allowance of posting of the generated electronic message 214, a change in the generated electronic message 214 prior to its posting, a denial of the generated electronic message 214 and/or one or more inputs for updating, such as training, of an analytical model employed by the analysis component 212. Accordingly, the one or more processes to be performed by the response generation system 202 can provide experience-based iterative training of the analytical model. An entity-in-the-loop (EITL) can provide accurate feedback and/or change the generated electronic message 214 before it is posted. The feedback provided by the EITL can be based on experience with interaction(s) and/or emotion(s).

It also will be appreciated that employment of the response generation system 202 is not limited to a single user and/or to a single primary electronic message. Rather, use of the response generation system 202 can be scalable, such as where the response generation system 202 can identify and/or respond to one or more primary electronic messages, such as at least partially in parallel.

Figure 3:
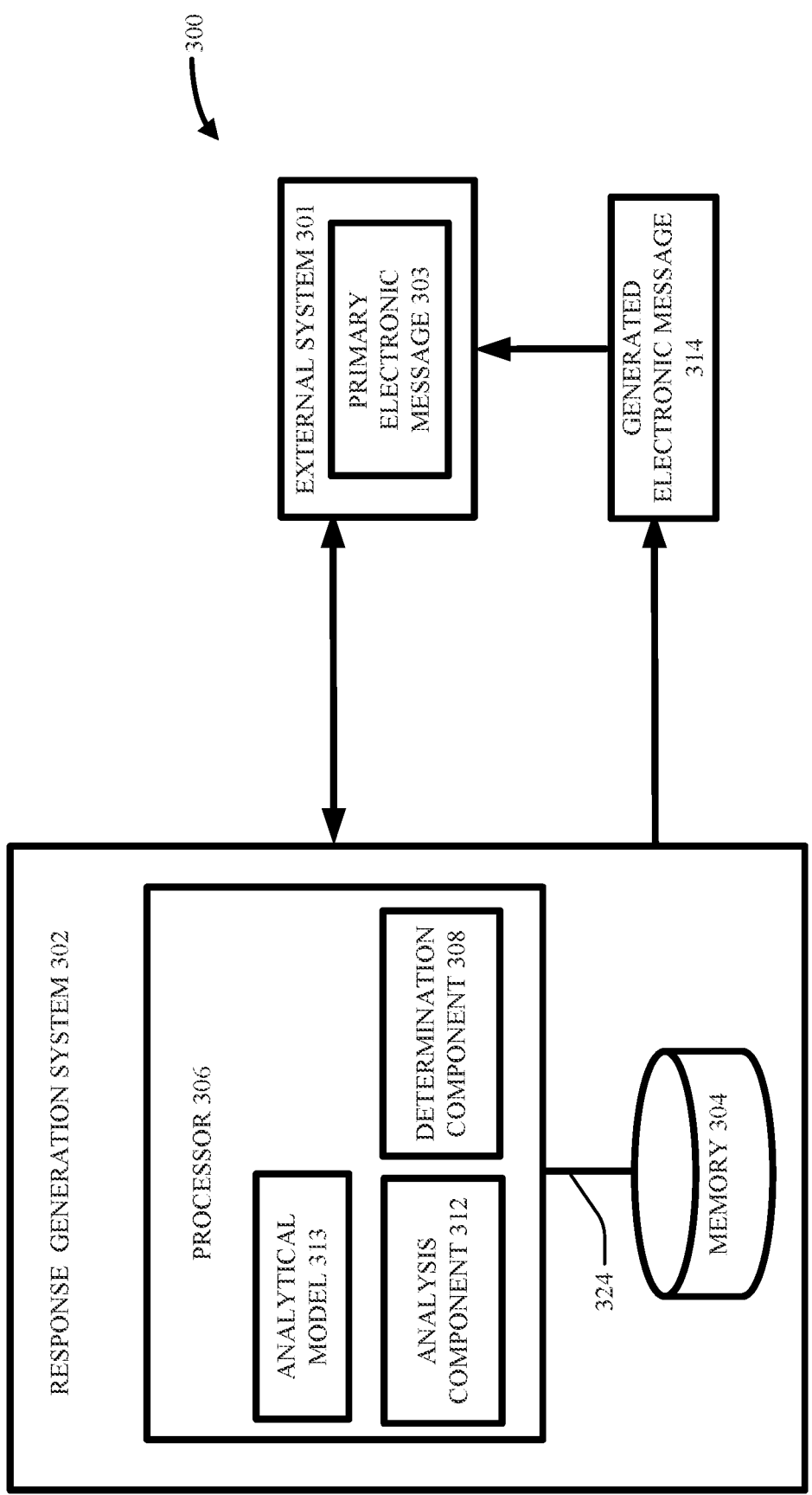
FIG. 3 illustrates still another block diagram of another example, non-limiting system that can facilitate a process to identify and respond to a primary electronic message, in accordance with one or more embodiments described herein.

Turning now to FIG. 3, the figure illustrates a block diagram of an example, non-limiting system 300 that can facilitate a process to identify and respond to a primary electronic message, in accordance with one or more embodiments described herein.

The non-limiting system 300 can comprise a response generation system 302, which can be associated with a cloud computing environment. The non-limiting system 300 can comprise one or more components, such as a memory 304, processor 306, bus 324, determination component 308 and/or updating component 316. Generally, response generation system 302, and thus non-limiting system 300, can facilitate a process to identify and respond to a primary electronic message 303.

As illustrated, the primary electronic message 303 can be submitted and/or posted at a system external to the response generation system 302 (e.g., at external system 301). In one or more other embodiments, the primary electronic message 303 alternatively can be submitted at the response generation system 302, where suitable. The external system 301 can be any suitable machine that can enable access to and/or run at least a portion of an electronic messaging platform for the submission and/or posting of one or more electronic messages. As used herein, the machine can be and/or can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet-enabled phone and/or another type of device. Although not shown, the external system 301 can include a respective memory and processor. In the illustrated embodiment, the non-limiting system 300 includes the external system 301. Alternatively, the external system 301 can be external to, but accessible by, the non-limiting system 300.

The determination component 308 can determine that the primary electronic message 303 has not received a response electronic message, such as from a third party entity. The determination can be based on any suitable default and/or selectively determined criterion, such as a time-based criterion. It will be appreciated that it can be generally determined that a response electronic message has not been received in response to the primary electronic message 303 from a user entity.

The updating component 316 can update an analytical model 313 at least partially in response to entity-in-the-loop (EITL) feedback applied to a generated electronic message 314 in response to the primary electronic message 303. In one or more embodiments, the generated electronic message 314 can be generated and/or posted by the response generation system 302, such as employing the analytical model 313.

Accordingly, the one or more processes to be performed by the response generation system 302 can provide experience-based iterative training of the analytical model 313. An entity-in-the-loop (EITL) can provide feedback that can be based on experience with interaction(s) and/or emotion(s). Updating the analytical model 313 can allow for improvements and/or changes in accuracy of the analytical model 313, which can be based on such experience.

It also will be appreciated that employment of the response generation system 302 is not limited to a single user and/or to a single primary electronic message. Rather, use of the response generation system 302 can be scalable, such as where the response generation system 302 can identify and/or respond to one or more primary electronic messages, such as at least partially in parallel. Likewise, the response generation system 302 can update, such as train, one or more analytical models relative to one or more inputs at least partially in parallel.

Figure 4:
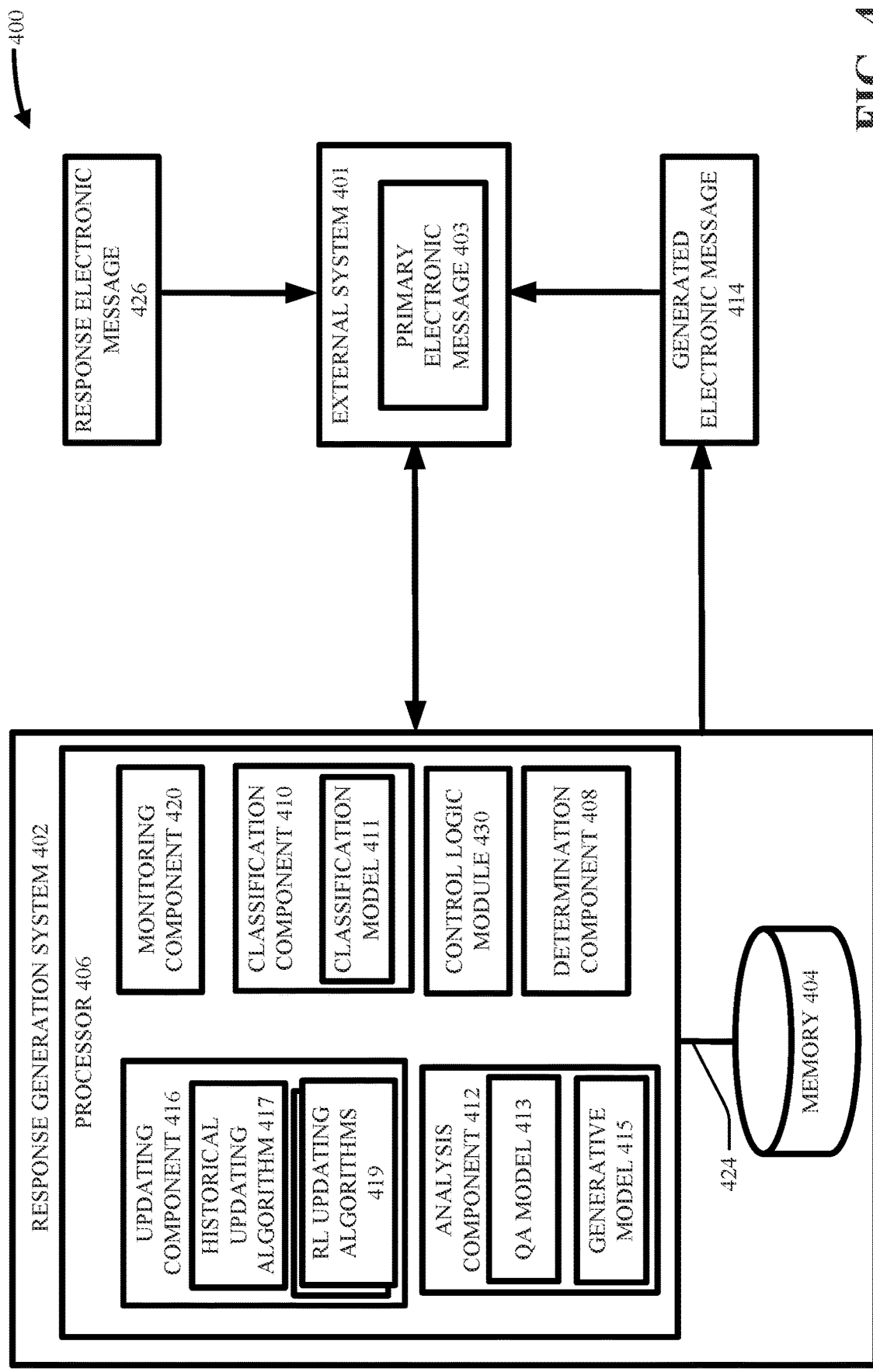
FIG. 4 illustrates yet another block diagram of another example, non-limiting system that can facilitate a process to identify and respond to a primary electronic message, in accordance with one or more embodiments described herein.

Turning next to FIG. 4, the figure illustrates a block diagram of an example, non-limiting system 400 that can facilitate a process to identify and respond to a primary electronic message in accordance with one or more embodiments described herein. It will be appreciated that descriptions regarding components of the non-limiting systems 100, 200 and/or 300 can apply to one or more like components of the non-limiting system 400 and/or vice versa.

It further will be appreciated that the following description(s) refer(s) to the identifying and responding to a single primary electronic message from a single user. The following description(s) also refer(s) to the updating of one or more analytical models based on the single primary electronic message and/or a single thread containing the single primary electronic message. However, it also will be appreciated that one or more of the processes described herein can be scalable. For example, as will be appreciated below, the response generation system 402 can identify and/or respond to two or more primary electronic messages in parallel and/or can update one or more analytical models based on two or more primary electronic messages and/or associated threads in parallel. These various levels of scaling can enable fast and efficient responding to users and/or updating, such as training, of one or more analytical models.

The non-limiting system 400 can comprise an external system 401, that is external to the response generation system 402. Alternatively, the external system 401 can be external to, but accessible by, the non-limiting system 400. As illustrated, a primary electronic message 403 can be submitted and/or posted at the external system 401. In one or more other embodiments, the primary electronic message 403 alternatively can be submitted at the response generation system 402, where suitable. The external system 401 can be any suitable machine that can enable access to and/or run at least a portion of an electronic messaging platform for the submission and/or posting of one or more electronic messages. As used herein, the machine can be and/or can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet-enabled phone and/or another type of device. Although not shown, the external system 401 can include a respective memory and processor.

The non-limiting system 400 also can comprise the response generation system 402, which can be associated with a cloud computing environment. The response generation system 402 can be comprised by and/or can comprise one or more machines. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In one or more embodiments, the response generation system 402 can be associated with a cloud computing environment 1050 described below with reference to FIG. 10 and/or with one or more functional abstraction layers described below with reference to FIG. 11 (e.g., hardware and software layer 1160, virtualization layer 1170, management layer 1180 and/or workloads layer 1190).

Response generation system 402 and/or components thereof (e.g., determination component 408, classification component 410, analysis component 412, updating component 416 and/or monitoring component 420) can employ one or more computing resources of the cloud computing environment 1050 described below with reference to FIG. 10, and/or with reference to the one or more functional abstraction layers (e.g., quantum software and/or the like) described below with reference to FIG. 11, to execute one or more operations in accordance with one or more embodiments described herein. For example, cloud computing environment 1050 and/or one or more of the functional abstraction layers 1160, 1170, 1180 and/or 1190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by response generation system 402 and/or components thereof to execute one or more operations in accordance with one or more embodiments described herein. For instance, response generation system 402 and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or other analytical model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein can be capable of being implemented in conjunction with any other type of computing environment now known or later developed.

Cloud computing can be a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics can be as follows:

On-demand self-service: a cloud consumer can unilaterally provision computing capabilities, such as server time and network storage, as needed automatically without requiring human interaction with the service's provider.

Broad network access: capabilities can be available over a network and accessed through standard mechanisms that can promote use by heterogeneous thin or thick client platforms (e.g., mobile phones, laptops, and PDAs).

Resource pooling: the provider's computing resources can be pooled to serve multiple consumers using a multi-tenant model, with different physical and virtual resources dynamically assigned and reassigned according to demand. There can be a sense of location independence in that the consumer generally can be without control and/or knowledge over the exact location of the provided resources but can be able to specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning often can appear to be unlimited and can be purchased in any quantity at any time.

Measured service: cloud systems can automatically control and/or optimize resource use by leveraging a metering capability at one or more levels of abstraction appropriate to the type of service (e.g., storage, processing, bandwidth and active user accounts). Resource usage can be monitored, controlled and/or reported, providing transparency for both the provider and consumer of the utilized service.

Service Models can be as follows:

Software as a Service (SaaS): the capability provided to the consumer can be to use the provider's applications running on a cloud infrastructure. The applications can be accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer can be to deploy onto the cloud infrastructure consumer-created or acquired applications created using programming languages and tools supported by the provider. The consumer does not manage or control the underlying cloud infrastructure including networks, servers, operating systems or storage, but can have control over the deployed applications and possibly application hosting environment configurations.

Infrastructure as a Service (IaaS): the capability provided to the consumer can be to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models can be as follows:

Private cloud: the cloud infrastructure can be operated solely for an organization. The cloud infrastructure can be managed by the organization and/or a third party and can exist on-premises or off-premises.

Community cloud: the cloud infrastructure can be shared by one or more organizations and can support a specific community that can have shared concerns (e.g., mission, security requirements, policy and/or compliance considerations). The cloud infrastructure can be managed by the organizations or a third party and can exist on-premises or off-premises.

Public cloud: the cloud infrastructure can be made available to the general public or to a large industry group and can be owned by an organization selling cloud services.

Hybrid cloud: the cloud infrastructure can be a composition of two or more clouds (private, community or public) that can remain unique entities but can be bound together by standardized or proprietary technology that can enable data and/or application portability (e.g., cloud bursting for load-balancing among clouds).

A cloud computing environment can be service-oriented with a focus on statelessness, low coupling, modularity and/or semantic interoperability. At the heart of cloud computing can be an infrastructure that can include a network of interconnected nodes.

Moreover, the non-limiting system 400 can be associated with or can be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, the non-limiting system 100 can be employed to use hardware and/or software to solve problems that are highly technical in nature and/or that are not abstract.

Turning now to aspects of the response generation system 402, various functions can be performed by one or more components thereof, such as a memory 404, processor 406, determination component 408, classification component 410, analysis component 412, updating component 416 and/or monitoring component 420.

Memory 404 can store one or more computer and/or machine readable, writable and/or executable components and/or instructions that, when executed by processor 406 (e.g., a classical processor, a quantum processor and/or like processor), can facilitate performance of operations defined by the executable component(s) and/or instruction(s). For example, memory 404 can store computer and/or machine readable, writable and/or executable components and/or instructions that, when executed by processor 406, can facilitate execution of the various functions described herein relating to response generation system 402, determination component 408, classification component 410, analysis component 412, updating component 416, monitoring component 420 and/or another component associated with response generation system 402 as described herein with or without reference to the various figures of the one or more embodiments.

Memory 404 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 404 are described below with reference to system memory 904 and FIG. 9. These examples of memory 404 can be employed to implement any one or more embodiments described herein.

Processor 406 can comprise one or more types of processors and/or electronic circuitry (e.g., a classical processor, a quantum processor and/or like processor) that can implement one or more computer and/or machine readable, writable and/or executable components and/or instructions that can be stored at memory 404. For example, processor 406 can perform various operations that can be specified by computer and/or machine readable, writable and/or executable components and/or instructions including, but not limited to, logic, control, input/output (I/O), arithmetic and/or the like. In one or more embodiments, processor 406 can comprise one or more of a central processing unit, multi-core processor, microprocessor, dual microprocessors, microcontroller, System on a Chip (SOC), array processor, vector processor, quantum processor and/or another type of processor. Additional examples of processor 406 are described below with reference to processing unit 906 and FIG. 9. The examples of processor 406 can be employed to implement any one or more embodiments described herein.

Response generation system 402, memory 404, processor 406, determination component 408, classification component 410, analysis component 412, updating component 416, monitoring component 420 and/or another component of response generation system 402 as described herein can be communicatively, electrically, operatively and/or optically coupled to one another via a bus 424 to perform functions of non-limiting system 400, response generation system 402 and/or any components coupled therewith. Bus 424 can comprise one or more of a memory bus, memory controller, peripheral bus, external bus, local bus, quantum bus and/or another type of bus that can employ various bus architectures. Further examples of bus 424 are described below with reference to system bus 908 and FIG. 9. The examples of bus 424 can be employed to implement any one or more embodiments described herein.

Response generation system 402 can comprise any type of component, machine, device, facility, apparatus and/or instrument that can comprise a processor and/or can be capable of effective and/or operative communication with a wired and/or wireless network. All such embodiments are envisioned. For example, response generation system 402 can comprise a server device, computing device, general-purpose computer, special-purpose computer, quantum computing device (e.g., quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device.

Response generation system 402 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In one or more embodiments, response generation system 402 can be coupled (e.g., communicatively, electrically, operatively, optically and/or the like) to one or more external systems, sources and/or devices (e.g., classical and/or quantum computing devices, communication devices and/or the like) via a network.

In one or more embodiments, a network can comprise one or more wired and/or wireless networks, including, but not limited to, a cellular network, wide area network (WAN) (e.g., the Internet), or local area network (LAN). For example, response generation system 402 can communicate (and vice versa) with one or more external systems, sources and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, response generation system 402 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that can facilitate communicating information among response generation system 402 and external systems, sources and/or devices (e.g., computing devices, communication devices and/or the like).

Response generation system 402 can comprise one or more computer and/or machine readable, writable and/or executable components and/or instructions that, when executed by processor 406 (e.g., a classical processor, a quantum processor and/or the like), can facilitate performance of one or more operations defined by such component(s) and/or instruction(s). Further, in one or more embodiments, one or more components associated with response generation system 402, as described herein with or without reference to the various figures, can comprise one or more computer and/or machine readable, writable and/or executable components and/or instructions that, when executed by processor 406, can facilitate performance of one or more operations defined by such component(s) and/or instruction(s). For example, determination component 408, classification component 410, analysis component 412, updating component 416, monitoring component 420 and/or any other components associated with response generation system 402 as disclosed herein (e.g., communicatively, electronically, operatively and/or optically coupled with and/or employed by response generation system 402), can comprise such computer and/or machine readable, writable and/or executable component(s) and/or instruction(s). Consequently, according to one or more embodiments, response generation system 402 and/or one or more components associated therewith as disclosed herein, can employ processor 406 to execute such computer and/or machine readable, writable and/or executable component(s) and/or instruction(s) to facilitate performance of one or more operations described herein with reference to response generation system 402 and/or any such components associated therewith.

Response generation system 402 can facilitate (e.g., via processor 406) performance of operations executed by and/or associated with determination component 408, classification component 410, analysis component 412, updating component 416, monitoring component 420 and/or another component associated with response generation system 402 as disclosed herein. For instance, as described in detail below, response generation system 402 can facilitate via processor 406 (e.g., a classical processor, a quantum processor and/or the like) a variety of processes including, but not limited to: a) locating a primary electronic message lacking receipt of a response electronic message; b) classifying the primary electronic message as seeking informational support or emotional support; c) generating an informational support or emotional support generated electronic message; d) enabling EITL feedback to the generated electronic message; and/or e) updating an analytical model generating the generated electronic message with feedback based on the EITL or based on a response electronic message provided by a third party entity, such as in response to the generated electronic message. In one or more embodiments, any one or more of the determination component 408, classification component 410, analysis component 412, updating component 416 and/or monitoring component 420 can be at least partially comprised by the processor 406.

Turning now to additional aspects illustrated at FIG. 4, such as the components of the response generation system 402 as illustrated in FIG. 4, further functionality of the response generation system 402 will be described. Additional description of functionalities will be further described below with reference to the example embodiment of FIG. 5, where repetitive description of like elements and/or processes employed in respective embodiments is omitted for sake of brevity.

Like the external system 401, the response generation system 402 generally can access a same electronic messaging platform having the primary electronic message posted thereto. For example, the determination component 408 can employ an accessing method, such as use of an API URL, access to the database, web page crawling, user-initiated data collection and/or any other suitable method path to fetch data from an online electronic messaging platform. Employing the accessing method, the determination component 408 can monitor the electronic messaging platform at a default or selectively determined frequency. The monitoring frequency can be selectively adjusted by a user entity, such as by an administrator entity. For example, a frequency can be about once per minute. The monitoring can include one or more filtering processes, such as to filter out offensive words and/or advertisements.

Generally, the determination component 408 can determine that the primary electronic message 403 has not received a response electronic message on the electronic messaging platform, such as from a third party entity. More particularly, for example, the determination component 408 can monitor the electronic messaging platform for a post identified as "new" by the electronic messaging platform or identified as "new" by the determination component 408, such as compared to a previous iteration of the monitoring. After having located the primary electronic message 403, the determination component 408 then can monitor the thread including the primary electronic message 403 for one or more additional postings from a different user than the user having posted the primary electronic message 403.

A determination can be made by the determination component 408 that a response electronic message 426 has not been received relative to the primary electronic message 403 and/or relative to the associated thread of the electronic messaging platform. The determination can be based on any suitable default and/or selectively determined criterion, such as a time-based criterion. In one example, a primary electronic message 403 remaining non-responded for ten or more minutes can be identified by the determination component 408 as "overlooked". That is, the determination component 408 can apply an electronic label in one or more databases, identifying the primary electronic message 403 as "overlooked".

For example, the determination component 408 can employ a timestamp of a time of posting of the electronic messaging platform, such as provided by the electronic messaging platform or by the response generation system 402 (e.g., the determination component 408) to start a counter. Where a response electronic message 426 is not received prior to the counter reaching a default count and/or elapsing, the respective primary electronic message 403 can be labeled as "overlooked".

It will be appreciated that it can be generally determined that a response electronic message 426 has not been received in response to the primary electronic message 403 from a user entity.

Figure 9:
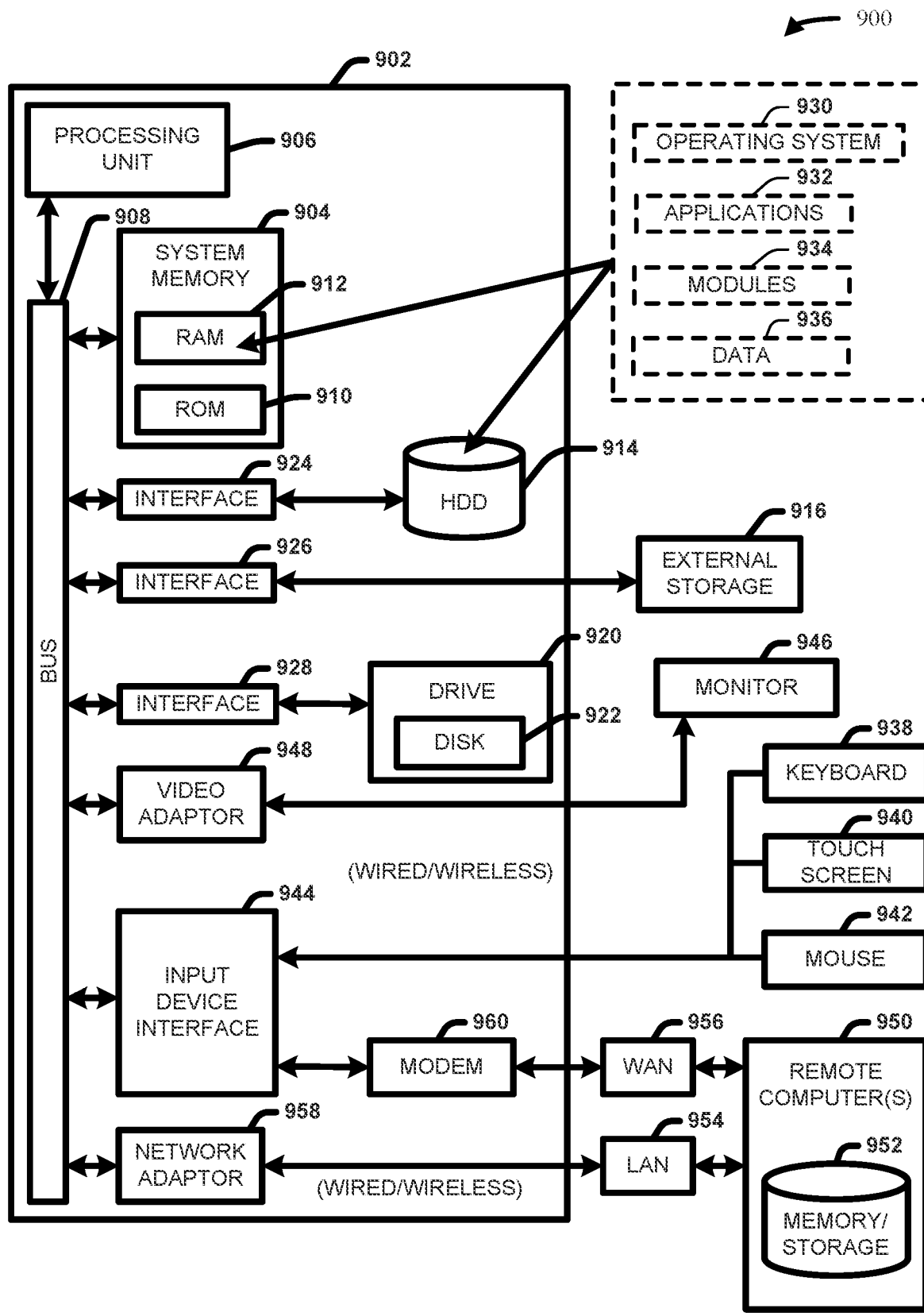
FIG. 9 illustrates a block diagram of an example, non-limiting operating environment in which one or more embodiments described herein can be facilitated.

Moreover, the determination component 408 can employ any one or more aspects of an operating environment, such as the operating environment 900 illustrated at FIG. 9, to obtain, such as to receive, retrieve, copy and/or otherwise provide, text of the primary electronic message 403. The text of the primary electronic message 403 can be stored in temporary and/or long term memory and/or other storage, such as employing the memory 404.

The classification component 410 can analyze the text of the primary electronic message 403 to thereby classify the primary electronic message 403. In one or more embodiments, the classification component 410 can operate to classify the primary electronic message 403 into at least one of at least two groups. The groups can include at least informational support seeking messages and emotional support seeking messages, also referred to herein as informational and emotional classes. To provide the classification, the classification component 410 can employ a classification model 411.

The classification model 411 can include and/or can access one or more classification algorithms. Such algorithm can be stored at the memory 404 and/or at a memory/storage external to the response generation system 402, such as at a cloud computing node 1010 of a cloud computing environment 1050 (FIG. 10).

Additionally, it will be appreciated that while the classification model 411 is depicted as being comprised by the classification component 410, the classification model 411 instead can be located elsewhere and accessed in any suitable manner by the classification component 410. That is, the classification model 411 can be comprised by the response generation system 402 and/or by a system external to the response generation system 402.

In one embodiment, the classification model 411 can be a convolutional neural network (CNN) model. The text of the primary electronic message 403 can be processed into word vectors, which word vectors can then be fed into the CNN model. The output can be a classification of the input into an informational class or an emotional class. In one or more cases, the CNN model can classify the input as informational or non-informational, where the non-informational class includes all emotional support seeking messages. In one or more other cases, the CNN model can classify the input as emotional or non-emotional, where the non-emotional class includes all informational support seeking messages. The classification (CNN) model 411 can be trained on initial data that is already defined in terms of at least two classes.

In one case, the CNN model can include a convolutional layer, two or more full-connection (FC) layers, an input layer and an output layer. In one example, the input layer can have about 600 neurons and the convolutional layer can include three consecutive operations/layers such as convolution with kernels, non-linear activation function and max pooling. In one example, the convolutional layer can include 256 kernels, the FC layer can contain 128 units with a dropout rate of 0.5. The classification model 411 can further be optimized for accuracy and a cross-validation, such as a 5-fold cross-validation, conducted. In one example, an overall cross-validation accuracy can be about 0.86 and F1 can be about 0.87.

Referring now to an example of an electronic messaging platform being an online support chat room, the inventors have discovered that users of such social support platform typically seek at least one of two types of support. These types are informational support and emotional support. For informational support, a poster/user entity often can look for accurate responses over diversity in response. For emotional support, a poster/user entity can often instead look for diversity in response. Accordingly, an advantage of classifying electronic messages into these two classes (e.g., informational and emotional) is that a poster/user entity can receive a distinct generated response message relative to the class of response the poster/user entity is seeking.

To provide one or more generated electronic messages 414 in response to an "overlooked" primary electronic message 403, the analysis component 412 can be employed. The analysis component 412 can generate a generated electronic message 414 addressing content of the primary electronic message 403. For example, the analysis component 412 can particularly address informational and/or emotional content of the primary electronic message 403. As used herein, informational content can include informational support seeking content. Also as used herein, emotional content can include emotional support seeking content.

To perform the analysis, the analysis component 412 can apply one or more analytical models to the text of the primary electronic message 403 to analyze the content thereof. For example, as illustrated, the response generation system 402, and particularly the analysis component 412, can include both a query-answer (QA) model 413 for analyzing informational support seeking text and a generative model 415 for analyzing emotional support seeking text. These analytical models 413 and 415 each can employ one or more algorithms to thereby generate a generated electronic message 414. In one or more other embodiments, the QA model 413 and the generative model 415 can be combined, such as employing different algorithms to analyze informational support seeking text as compared to emotional support seeking text. Such algorithms can be stored at the memory 404 and/or at a memory/storage external to the response generation system 402, such as at a cloud computing node 1010 of a cloud computing environment 1050 (FIG. 10).

Generally, a rule-based algorithm can be employed to identify and reuse an electronic message as a generated electronic message 414 in response to a primary electronic message classified in the informational class. Such historical message can be from a historical response posted by other users in the past. For example, a rule-based algorithm can map user-written natural language text into a formal query. The query can be employed relative to a database, such as a structured knowledge database comprising historical responses to output the generated electronic message 414.

Generally, a sequence-to-sequence algorithm can be employed to provide a generated electronic message 414 for the emotional classification of primary electronic message.

Broadly, for a given input sequence of words (e.g., text of the primary electronic message 403), another sequence of words (e.g., text of a generated electronic message 414) is output that best suits the input. The generative model 415 employing such an algorithm can be derived from a sequence-to-sequence model with an attention mechanism (e.g., selectively focusing on a few relevant aspects while ignoring others). The sequence-to-sequence model can take in a sequence of text tokens, such as from user posts (e.g., electronic message), and generate another sequence of text tokens, such as the generated electronic messages. The generative model 415 can include and/or function cooperatively with an information retrieval (IR) model.

Training data for training the generative model 415 can include a plurality of samples of electronic message threads including, but not limited to, entity-posted and/or entity-derived electronic messages, thus providing the experience grounding for the generative model 415. In one embodiment a set of data is filtered for offensive words and advertisement posts. A list of stop words can be defined to eliminate advertisement posts. A long short-term memory network (LSTM) can be employed as an encoder. Attention can be applied over a decoder LSTM and combined with a current hidden state at one or more target time steps to produce a prediction of a next word. The prediction can be fed into the decoder LSTM. The LSTM can be 2-layer deep, with each layer having about 500 memory cells, and with training thereof utilizing a stochastic gradient descent and about 0.2 dropout. This trained data can be employed by the generative model 415 to output a generated electronic message 414.

Additionally, it will be appreciated that while the QA model 413 and generative model 415 are depicted as being comprised by the analysis component 412, these models 413 and/or 415 instead can be located elsewhere and accessed in any suitable manner by the analysis component 412. That is, the QA model 413 and/or generative model 415 can be comprised by the response generation system 402 and/or by a system external to the response generation system 402.

The monitoring component 420 can enable entity-in-the-loop (EITL) feedback to the generated electronic message 414, such as via an interface communicatively connected to the response generation system 402. In one example, an entity can provide the EITL employing any suitable communicative connection to the monitoring component 420 and/or response generation system 402 to thereby monitor and/or to input information relative to the generated electronic message 414. In another example in which the entity is a human, the entity can provide human-in-the-loop feedback utilizing a tablet, screen, keyboard, mouse or other input device to thereby monitor and/or to input information relative to the generated electronic message 414.

Turning back to entities generally, the EITL feedback can include one or more of an allowance of posting of the generated electronic message 414, a change in the generated electronic message 414 prior to its posting, a denial of the generated electronic message 414 and/or one or more inputs for updating, such as training, of an analytical model employed by the analysis component 412 (e.g., the generative model 415). Where the EITL allows the generated electronic message 414, the response generation system 402 can respond to the primary electronic message 403 with the generated electronic message 414. Where the EITL changes the posting, the response generation system 402 can instead post the modified generated electronic message 414.

In one or more embodiments, the response generation system 402 further can comprise a control logic module 430, which can comprise software and/or hardware. The control logic module 430 can direct the workflow through the response generation system 402. In one embodiment, the control logic module 430 can transfer the obtained text of the primary electronic message 403 to the classification component 410 and then to the analysis component 412. The control logic module 430 also can direct the transfer of a generated electronic message 414 to the monitoring component 420 and the posting of the generated electronic message 414 to the respective electronic messaging platform, such as via an associated API URL path, access to the database, web page crawling, user-initiated data collection and/or any other suitable method. Likewise, the control logic module 430 can direct transfer of the generated electronic message 414 and/or of any response electronic message(s) 426 to the updating component 416.

That is, in addition to generating a response to the primary electronic message 403, the response generation system 402 can employ one or more feedbacks to update the QA model 413 and/or generative model 415 to continue to increase accuracy, coherency and/or acceptability of generated electronic messages 414. For example, the updating component 416 can update the QA model 413 or the generative model 415, depending on which model was employed to generate the generated electronic message 414. The one or more feedbacks can include the generated electronic message 414, one or more feedbacks or changes from the entity (e.g., administrator entity) monitoring the outputs of the analysis component 412 via the monitoring component 420, and/or one or more response electronic messages 426 posted and/or submitted by a third party entity.

Figure 5:
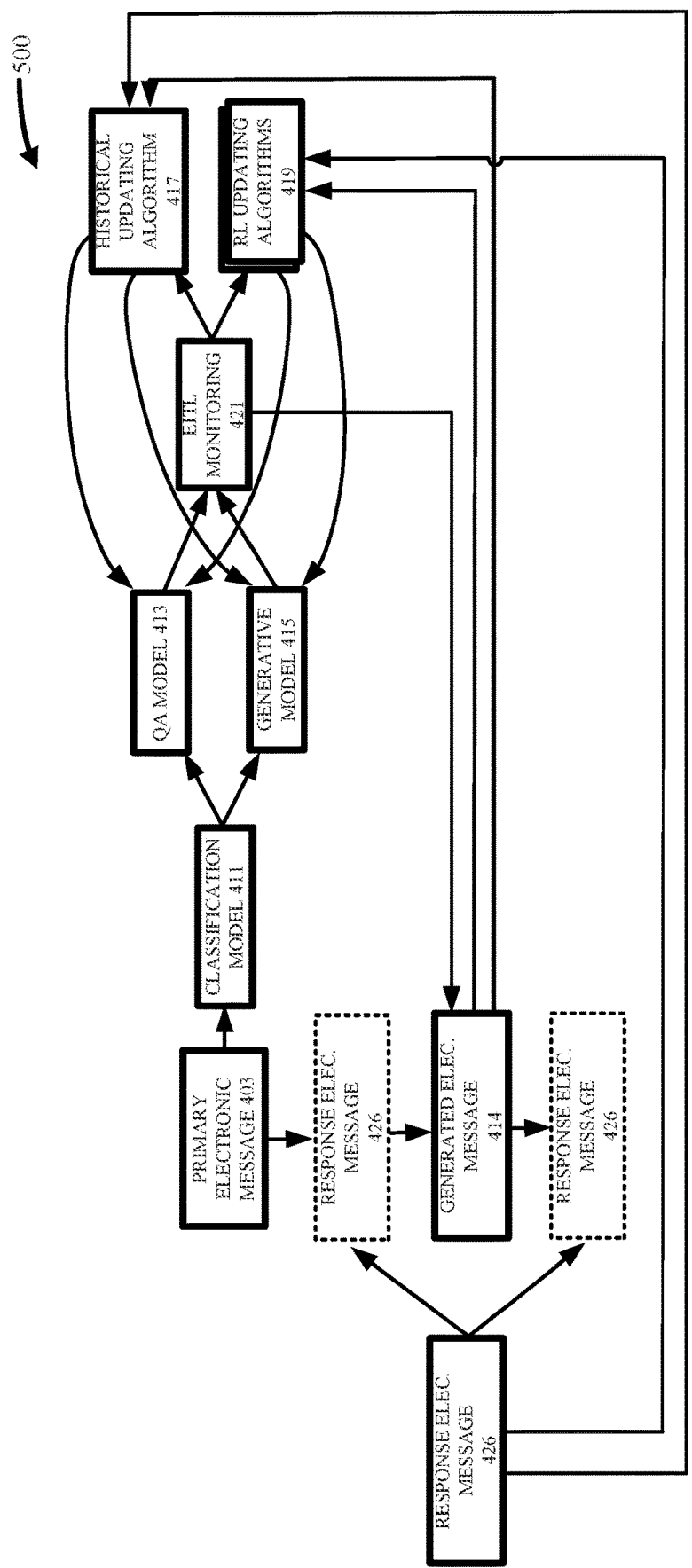
FIG. 5 illustrates a workflow of the non-limiting system of FIG. 4, employing various analytical models to facilitate a process to identify and respond to a primary electronic message, in accordance with one or more embodiments described herein.

For example, turning briefly to FIG. 5, an illustration of a workflow 500 for processing of a primary electronic message 403 is depicted. The workflow 500 includes one or more operations performed by one or more components of the response generation system 402 of FIG. 4. Repetitive description of like elements and/or processes employed in respective embodiments is omitted for sake of brevity.

As illustrated at FIG. 5, a response electronic message 426 can be posted and/or submitted by a third party entity generally subsequent to the determination by the determination component 408 relative to the "overlooked" primary electronic message. As depicted, a posting of a response electronic message 426 can beat a generation of a generated electronic message 414 and be posted first to the respective communication thread at the respective electronic messaging platform. This can occur where the EITL makes one or more changes to the generated electronic message 414. Alternatively and/or additionally, a response electronic message 426 can be posted after posting of the generated electronic message 414 by the response generation system 402.

Also as shown at FIG. 5, and still additionally referring to FIG. 4, the response electronic message 426 and/or the generated electronic message 414 can be employed by the reinforced learning updating algorithm 419 of the updating component 416 to update either the QA model 413 or the generative model 415. That is, while it will be appreciated that a process of generating and/or training of a model from data can be generally known to a person having ordinary skill in the art of neural networks or deep neural networks, the response generation system 402 can employ one or more unique reinforced learning (RL) updating algorithms 419 and/or a historical updating algorithm 417 to continue to train the QA model 413 and generative model 415. Such algorithms can be stored at the memory 404 and/or at a memory/storage external to the response generation system

Figure 10:
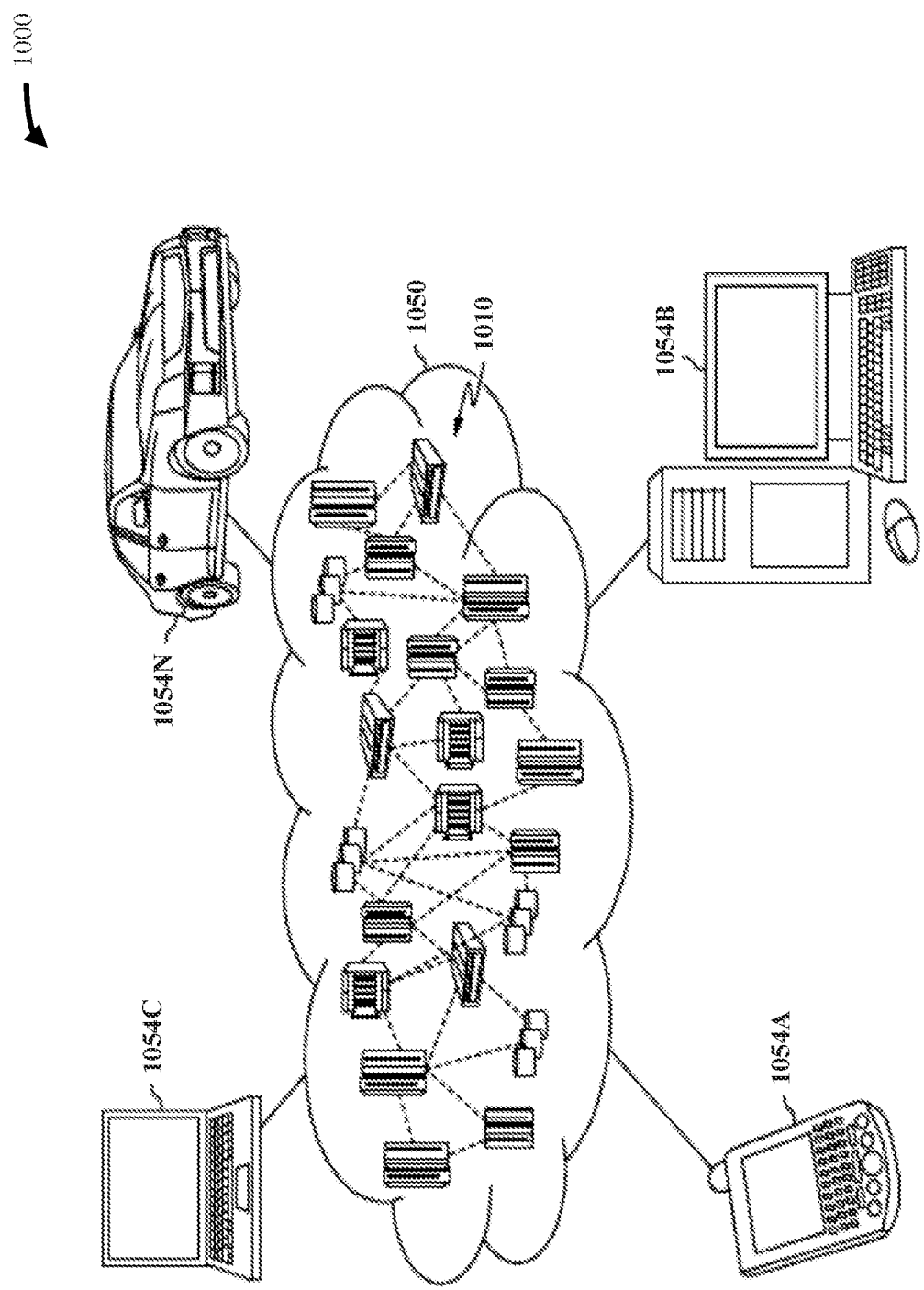
FIG. 10 illustrates a block diagram of an example, non-limiting cloud computing environment in accordance with one or more embodiments described herein.

402, such as at a cloud computing node 1010 of a cloud computing environment 1050 (FIG. 10). This updating will be discussed below in detail.

Turning first to the historical updating algorithm 417, this algorithm can add text and/or word vectors from one or more response electronic messages 426 and/or the generated electronic message 414 to one or more databases employed by the QA model 413 and/or generative model 415. The one or more databases can be comprised by the analysis component 412 and/or by the memory 404. Alternatively and/or additionally, the one or more databases instead can be located elsewhere and accessed in any suitable manner by the analysis component 412. That is, the one or more databases can be comprised by the response generation system 402 and/or by a system external to the response generation system 402.

Turning next to the reinforced learning updating algorithms 419, the updating component 416 can employ one or more such algorithms. In one embodiment, separate algorithms can be employed for updating based upon the classification of the primary electronic message 403 for which the generated electronic message 414 was generated.

Relative to a primary electronic message 403 classified as informational, an algorithm considering F1 score and cross entropy loss can be employed. Equation 1, below, can be employed to provide a reward rating based on a comparison between a generated electronic message 414 and a modified generated electronic message 414 (e.g., modified by an EITL). In Equation 1, "ans(s,e)" represents text of the response electronic message 426, "ans(st,et)" represents text of the original generated electronic message 414, and "ans (st^,et^) represents text of a generated electronic message 414 modified by an EITL.

Equation 2, below, can be employed after calculation of an output for Equation 1 to determine a derivative of the associated loss function determined at Equation 1. The derivative of the loss function can be translated to a logarithmic function of the probability of the reward Function® and the weights) Θ). With reference to Equations 1 and 2, $l_{rl}$ is a loss function, Θ is a weight of the loss function, R is the reward function, s is the ground truth sentence, e is the ground truth response, $s_T\hat{}$ is the initial generated post (e.g., the primary electronic message 403), $e_T\hat{}$ is the initially generated response (e.g., the generated electronic message 414 without EITL), $s_T$ is an entity operator supplied corrected post, and $e_T$ is the entity operator supplied corrected response (e.g., the modified generated electronic message 414 from the EITL).

$$l_{rl}(\theta) = -\mathbb{E}_{\hat{r} \sim p_r}[R(s, e, \hat{s}_T, \hat{e}_T; \theta)]$$ Equation 1

$$\approx -\mathbb{E}_{\hat{r} \sim p_r}[F_1(ans(\hat{s}_T, \hat{e}_T), ans(s, e)) - F_1(ans(s_T, e_T), ans(s, e))]$$

$$\nabla_\theta l_{rl} = -\nabla_\theta (\mathbb{E}_{\hat{r} \sim p_r}[R])$$ Equation 2

$$= -\mathbb{E}_{\hat{r} \sim p_r}[R \nabla_\theta \log p_r(r; \theta)]$$

Relative to a primary electronic message 403 classified as emotional, a multi-faceted algorithm can be employed. The generative algorithm illustrated below at Equation 3 considers each of ease of answering ($r_1$), information flow ($r_2$) and semantic coherence ($r_3$) in determining an overall reward rating (r). The reward rating can be employed to describe a similarity or difference of the generated electronic message 414 as compared to the modified generated electronic message 414 (e.g., after the EITL). As described above, ease of answering refers to the availability of numerous different responses to a primary electronic message without providing a dull or non-helpful response. Information flow refers to the promotion of continued posting of electronic message either by the primary user or by third parties also employing the chatbot system, such as where multiple users have visual and/or posting access to the thread of responses. Semantic coherence refers to a response being grammatical and/or coherent. Further regarding Equation 3, $p_i$ represents the original generated electronic message 414 (e.g., without EITL involvement) and $q_i$ represents the text of the primary electronic message 403.

To determine the reward rating at Equation 3, each of the separate variables $r_1$, $r_2$ and $r_3$ can be determined by separate respective equations. That is, Equation 4 can be employed to determine an output for ease of answering ($r_1$), Equation 5 can be employed to determine an output for information flow ($r_2$), and Equation 6 can be employed to determine an output for semantic coherence ($r_3$). Regarding Equation 4, $p_{seq2seq}$ represents probability, s represents the total number of a variety of generated electronic messages for a given primary electronic message, S represents the total number of training data, a represents a weight, and N represents a total number of the primary electronic message texts in the training data set. Regarding Equation 5, $h_{pi}$ and $h_{pi+1}$ represent the probabilities that when the i'th sentence is given, what is the probability of the i+1'th sentence being the generated electronic message 414. Regarding Equation 6, $p_{seq2seq}$ represents probability, $q_1$ represents the text of the modified generated electronic message 414, and $p_i$ represents the original generated electronic message 414 (e.g., without EITL involvement).

$$r(a, [p_i, q_i]) = \lambda_1 r_1 + \lambda_2 r_2 + \lambda_3 r_3$$ Equation 3

$$r_1 = -\frac{1}{N_S} \sum_{s \in S} \frac{1}{N_s} \log p_{seq2seq}(s|a)$$ Equation 4

$$r_2 = -\log \cos(h_{p_i}, h_{p_{i+1}}) = -\log \cos \frac{h_{p_i} \cdot h_{p_{i+1}}}{\|h_{p_i}\| \|h_{p_{i+1}}\|}$$ Equation 5

$$r_3 = \frac{1}{N_a} \log p_{seq2seq}(a|q_i, p_i) + \frac{1}{N_{qi}} \log p_{seq2seq}^{backward}(q_i|a)$$ Equation 6

After calculating the respective reward rating r, this rating can be employed to update the generative model 415. Alternatively, the total reward r can be added to one or more databases relative to the original generated electronic message 414 and/or a generated electronic message 414 modified by an EITL.

Regarding the above-described one or more components of the response generation system 402, it will be appreciated that the various processes discussed above as being performed by the one or more of the components alternatively can be performed by one or more alternative components in one or more other embodiments. That is, the software and/or hardware comprised and/or utilized by any one or more component of the response generation system 402 can instead be comprised and/or utilized by a different one or more components of a respective alternative embodiment of the response generation system 402. For example, any one or more of the various processes discussed above can be performed by the processor 406.

Figure 6:
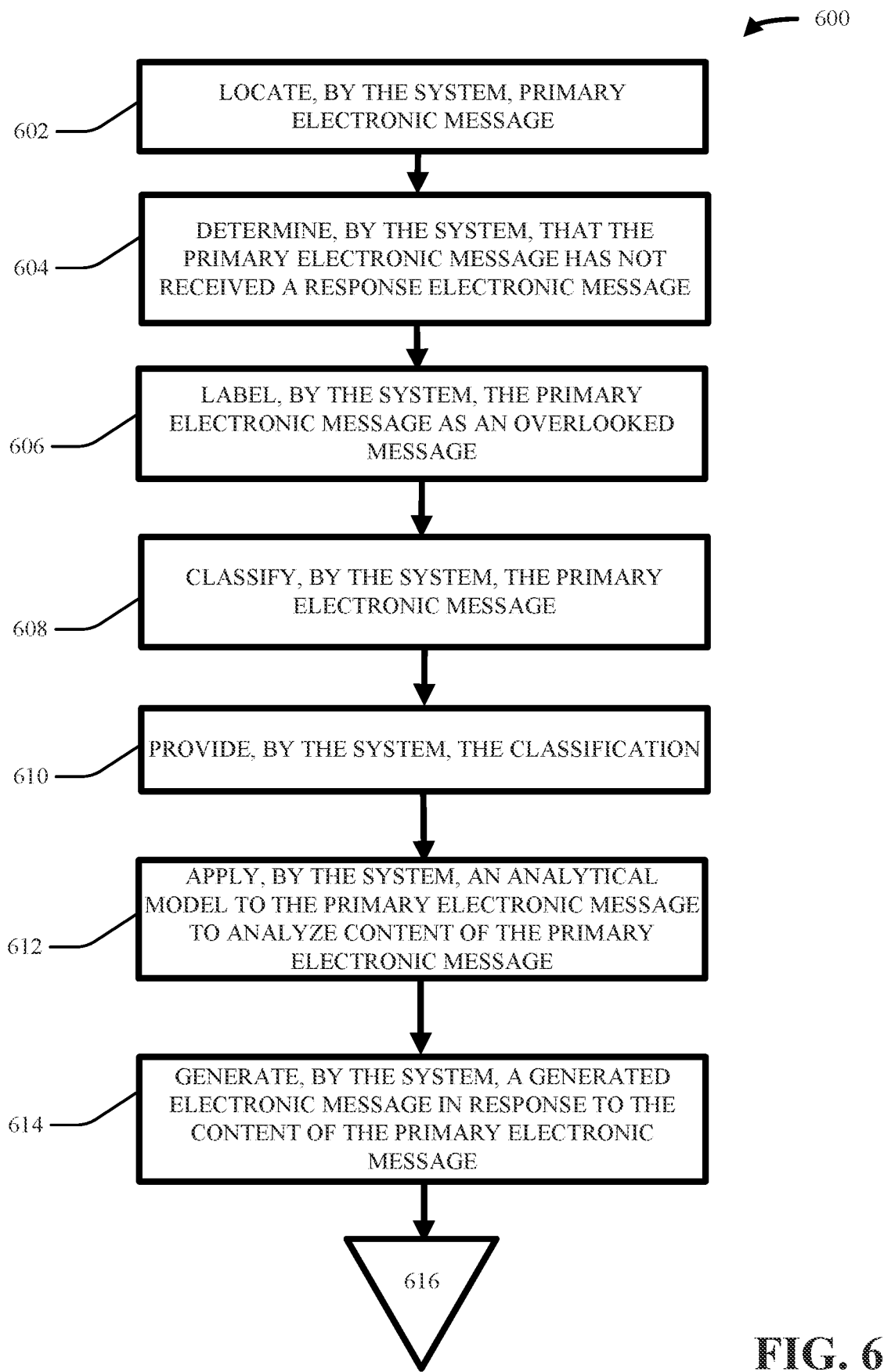
FIG. 6 illustrates a flow diagram of an example, non-limiting computer-implemented method that can facilitate a process to identify and respond to a primary electronic message, in accordance with one or more embodiments described herein.
Figure 7:
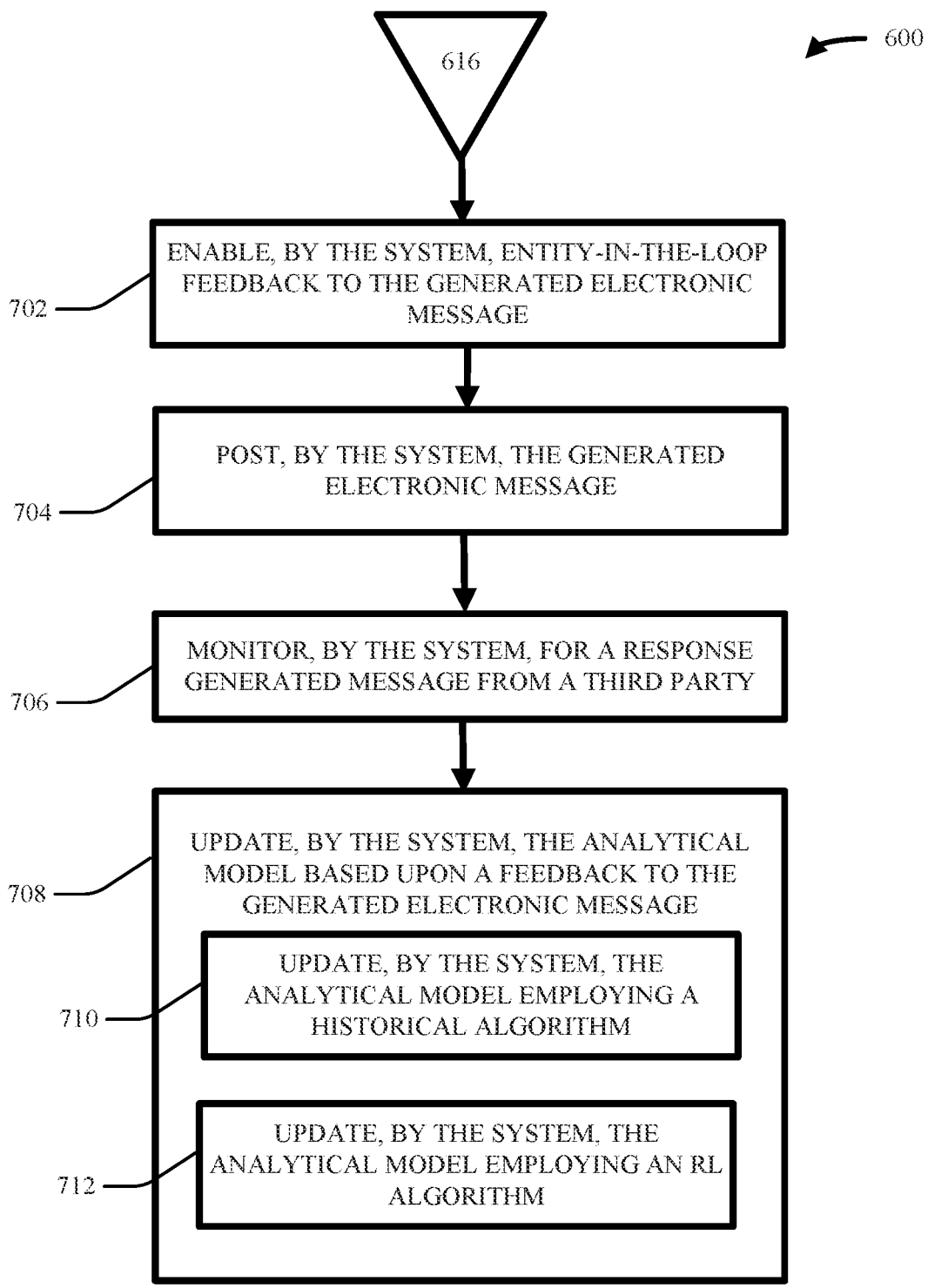
FIG. 7 illustrates a continuation of the flow diagram of FIG. 6 of an example, non-limiting computer-implemented method that can facilitate a process to identify and respond to a primary electronic message, in accordance with one or more embodiments described herein.
Figure 8:
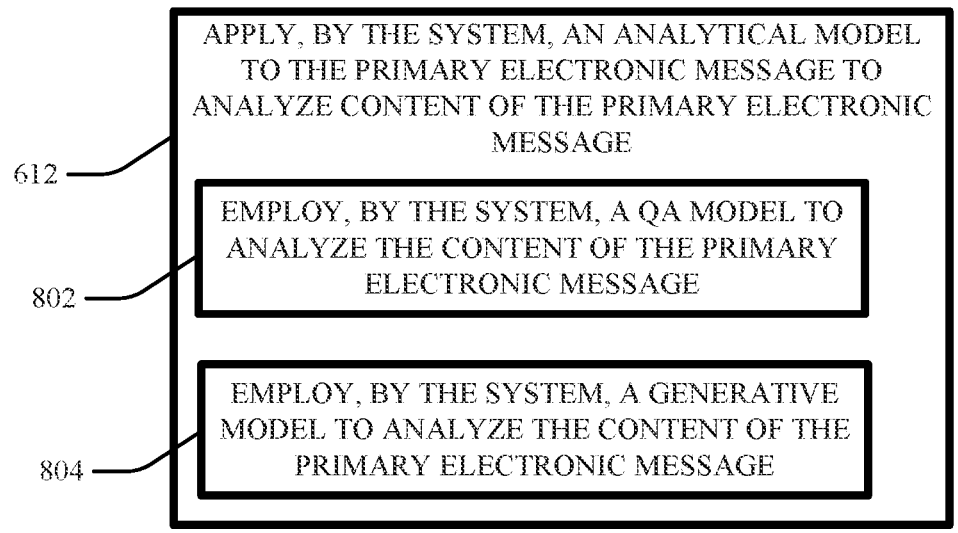
FIG. 8 illustrates a continuation of the flow diagram of FIG. 6 of an example, non-limiting computer-implemented method that can facilitate a process to identify and respond to a primary electronic message, in accordance with one or more embodiments described herein.

Referring next to FIGS. 6 to 8, these figures together illustrate a flow diagram of an example, non-limiting computer-implemented method 600 that can facilitate a process to identify and respond to a primary electronic message, in accordance with one or more embodiments described herein. While aspects of the non-limiting system 400 are referenced below relative to the various operations of the computer-implemented method 600, one or more of the various operations of the computer-implemented method 600 also are relevant to the above-described non-limiting systems 100, 200 and 300. Accordingly, repetitive description of like elements and/or processes employed in respective embodiments is omitted for sake of brevity.

Looking first to 602 at FIG. 6, the computer-implemented method 600 can comprise locating, by the system (e.g., via response generation system 402 and/or determination component 408), a primary electronic message (e.g., primary electronic message 403 obtained from external system 401).

Looking to 604, the computer-implemented method 600 can comprise determining, by the system (e.g., via response generation system 402 and/or determination component 408), that the primary electronic message (e.g., primary electronic message 403 obtained from external system 401) has not received a response electronic message (e.g., response electronic message 426).

Looking to 606, the computer-implemented method 600 can comprise labeling, by the system (e.g., via response generation system 402 and/or determination component 408) the primary electronic message (e.g., primary electronic message 403 obtained from external system 401) as an "overlooked" message.

At 608, the computer-implemented method 600 can comprise classifying, by the system (e.g., via response generation system 402 and/or classification component 410) the primary electronic message (e.g., primary electronic message 403), such as according to a classification algorithm (e.g., a classification algorithm employed by classification model 411).

At 610, the computer-implemented method 600 can comprise providing, by the system (e.g., via response generation system 402, the classification component 410 and/or the control logic module 430) the classification of the primary electronic message (e.g., primary electronic message 403).

At 612, the computer-implemented method 600 can comprise applying, by the system (e.g., via response generation system 402 and/or analysis component 412) an analytical model (e.g., QA model 413 or generative model 415) to the primary electronic message (e.g., primary electronic message 403), to analyze content (e.g., informational or emotional text) of the primary electronic message (e.g., primary electronic message 403).

At 614, the computer-implemented method 600 can comprise generating, by the system (e.g., via response generation system 402 and/or analysis component 412) a generated electronic message (e.g., generated electronic message 414) in response to the content (e.g., informational or emotional text) of the primary electronic message (e.g., primary electronic message 403).

Turning now briefly to FIG. 8, the computer-implemented method 600 is continued. Processes performed as part of the application block 612 are illustrated. Repetitive description of like elements and/or processes employed in respective embodiments is omitted for sake of brevity. It will be appreciated that the system (e.g., response generation system 402 and/or selecting component 122) can employ only one of the block 802 or the block 804 depending on the classification of the primary electronic message (e.g., primary electronic message 403).

At 802, the computer-implemented method 600 can comprise employing, by the system (e.g., via response generation system 402 and/or analysis component 412) a QA model (e.g., QA model 413) to analyze the content (e.g., informational text) of the primary electronic message (e.g., primary electronic message 403).

At 804, the computer-implemented method 600 can comprise employing, by the system (e.g., via response generation system 402 and/or analysis component 412) a generative model (e.g., generative model 415) to analyze the content (e.g., emotional text) of the primary electronic message (e.g., primary electronic message 403).

Turning now to FIG. 7, the computer-implemented method 600 illustrated at FIG. 6 is directly continued via connection at the continuation triangle 616. Repetitive description of like elements and/or processes employed in respective embodiments is omitted for sake of brevity.

At 702, the computer-implemented method 600 can comprise enabling, by the system (e.g., via response generation system 402 and/or monitoring component 420) entity-in-the-loop feedback to the generated electronic message (e.g., generated electronic message 414).

At 704, the computer-implemented method 600 can comprise posting, by the system (e.g., via response generation system 402, analysis component 412, monitoring component 420 and/or control logic module 430) the generated electronic message (e.g., generated electronic message 414) to the thread of the electronic messaging platform having the primary electronic message (e.g., primary electronic message 403).

At 706, the computer-implemented method 600 can comprise monitoring, by the system (e.g., via response generation system 402, determination component 408 and/or control logic module 430) for a response electronic message (e.g., response electronic message 426) from a third party entity, such as at the thread of the electronic messaging platform having the primary electronic message (e.g., primary electronic message 403).

At 708, the computer-implemented method 600 can comprise updating, by the system (e.g., via response generation system 402, updating component 416 and/or control logic module 430), the utilized analytical model (e.g., QA model 413 or generative model 415) based upon a feedback to the generated electronic message (e.g., generated electronic message 414). Updating block 808 can include one or both of the processes comprised by updating block 810 and updating block 812.

At 710, the computer-implemented method 600 can comprise updating, by the system (e.g., via response generation system 402, updating component 416 and/or control logic module 430) the utilized analytical model (e.g., QA model 413 or generative model 415) employing a historical algorithm (e.g., historical updating algorithm 417).

At 712, the computer-implemented method 600 can comprise updating, by the system (e.g., via response generation system 402, updating component 416 and/or control logic module 430) the utilized analytical model (e.g., QA model 413 or generative model 415) employing a reinforced learning (RL) algorithm (e.g., RL updating algorithms 419, such as the informational algorithm of Equation 1 or the generative algorithm of Equation 3).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In the examples above, it also should be appreciated that response generation system 402 and/or non-limiting system 400 can enable scaled electronic message identifying and/or responding. For example, the response generation system 402 can identify and/or respond to two or more primary electronic messages in parallel and/or can update one or more analytical models based on two or more primary electronic messages and/or associated threads in parallel. These various levels of scaling can enable fast and efficient responding to users and/or updating, such as training, of one or more analytical models (e.g., QA model 413 and/or generative model 415).

As also will be appreciated, the response generation system 402 and/or non-limiting system 400 provides a new approach driven by previously unincorporated classification, entity-in-the-loop and/or analytical model updating, such as while the analytical model is active. For example, response generation system 402 and/or non-limiting system 400 can provide a new approach to quickly and/or automatically respond to an "overlooked" primary electronic message 403. Furthermore, such response can be better directed, as compared to responses from current chatbot systems, to the underlying intent (e.g., informational or emotional) of the poster entity of the primary electronic message 403. In turn, the response generation system 402 and/or non-limiting system 400 can enhance the experience of the poster entity with the respective electronic messaging platform. This enhanced experience also can lead to increased usage of the electronic messaging platform by the poster entity and/or by another user entity monitoring the respective communication thread(s).

Response generation system 402 and/or non-limiting system 400 can provide technical improvements to one or more analytical models associated with response generation system 402. For example, in performing the above-described updating, response generation system 402 can increase the accuracy, coherency and/or acceptability of various generated electronic messages output by the response generation system 402 and/or non-limiting system 400. This can be at least in part due to the entity-in-the-loop monitoring enabled by the response generation system 402 and/or non-limiting system 400. An entity-in-the-loop (EITL) can provide accurate feedback and/or change a generated electronic message before it is posted. The feedback provided by the EITL can be based on experience with interaction(s) and/or emotion(s). This feedback can be applicable to the effectiveness of the generated electronic message and/or as historical data relative to the primary electronic message. Furthermore, updating the analytical model while it remains active allows for rapid improvements and/or changes in accuracy of the analytical model. Moreover, this rapid iterative training of the analytical model can employ third party feedback via considering one or more response electronic messages posted, submitted and/or uploaded by a third party entity.

A practical application of the response generation system 402 and/or non-limiting system 400 is that it can be implemented in one or more domains to enable scaled electronic message identifying and/or responding. For example, the response generation system 402 can identify and/or respond to two or more primary electronic messages in parallel and/or can update one or more analytical models based on two or more primary electronic messages and/or associated threads in parallel.

In one or more embodiments, one or more of the processes described herein can be performed by one or more specialized computers (e.g., a specialized processing unit, a specialized classical computer, a specialized quantum computer and/or another type of specialized computer) to execute defined tasks related to the various technologies identified above. Response generation system 402 and/or components thereof, can be employed to solve new problems that arise through advancements in technologies mentioned above, employment of quantum computing systems, cloud computing systems, computer architecture and/or another technology.

According to one or more embodiments, response generation system 402 and/or non-limiting system 400 also can be fully operational towards performing one or more other functions (e.g., fully powered on, fully executed and/or another function) while also performing the various operations described herein.

Although the one or more advantages described above have been described relative to the non-limiting system 400, it will be appreciated that one or more of the advantages are applicable to the non-limiting systems 100, 200 and/or 300.

In order to provide additional context for various embodiments described herein, FIG. 9 and the following discussion are intended to provide a brief, general description of a suitable operating environment 900 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located both in local and remote memory storage devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, disk storage and/or other magnetic storage devices, solid state drives and/or other solid state storage devices, and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network and/or direct-wired connection, and/or wireless media such as acoustic, RF, infrared and/or other wireless media.

With reference again to FIG. 9, the example operating environment 900 for implementing various embodiments of the aspects described herein includes a computer 902, the computer 902 including a processing unit 906, a system memory 904 and/or a system bus 908. The system bus 908 can couple system components including, but not limited to, the system memory 904 to the processing unit 906. The processing unit 906 can be any of various commercially available processors. Dual microprocessors and/or other multi-processor architectures can be employed as the processing unit 906.

The system bus 908 can be any of one or more types of bus structure that can further interconnect to a memory bus (with or without a memory controller), a peripheral bus and/or a local bus using any of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can also include a high-speed RAM, such as static RAM for caching data.

The computer 902 further can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and methods described herein can be implemented utilizing various commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

A user entity can enter commands and information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 906 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be also connected to the system bus 908 via an interface, such as a video adapter 948. In addition, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal or external and a wired and/or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link among the computers can be used.

When used in either a LAN or WAN networking environment, the computer 902 can access cloud storage systems or other network-based storage systems in addition to, or in place of, external storage devices 916 as described above, such as but not limited to, a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf and/or the like), and/or telephone. This can include Wireless Fidelity (Wi-Fi) and BLUETOOTH® wireless technologies. Thus, the communication can be a pre-defined structure as with a conventional network or simply an ad hoc communication between at least two devices.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Figure 11:
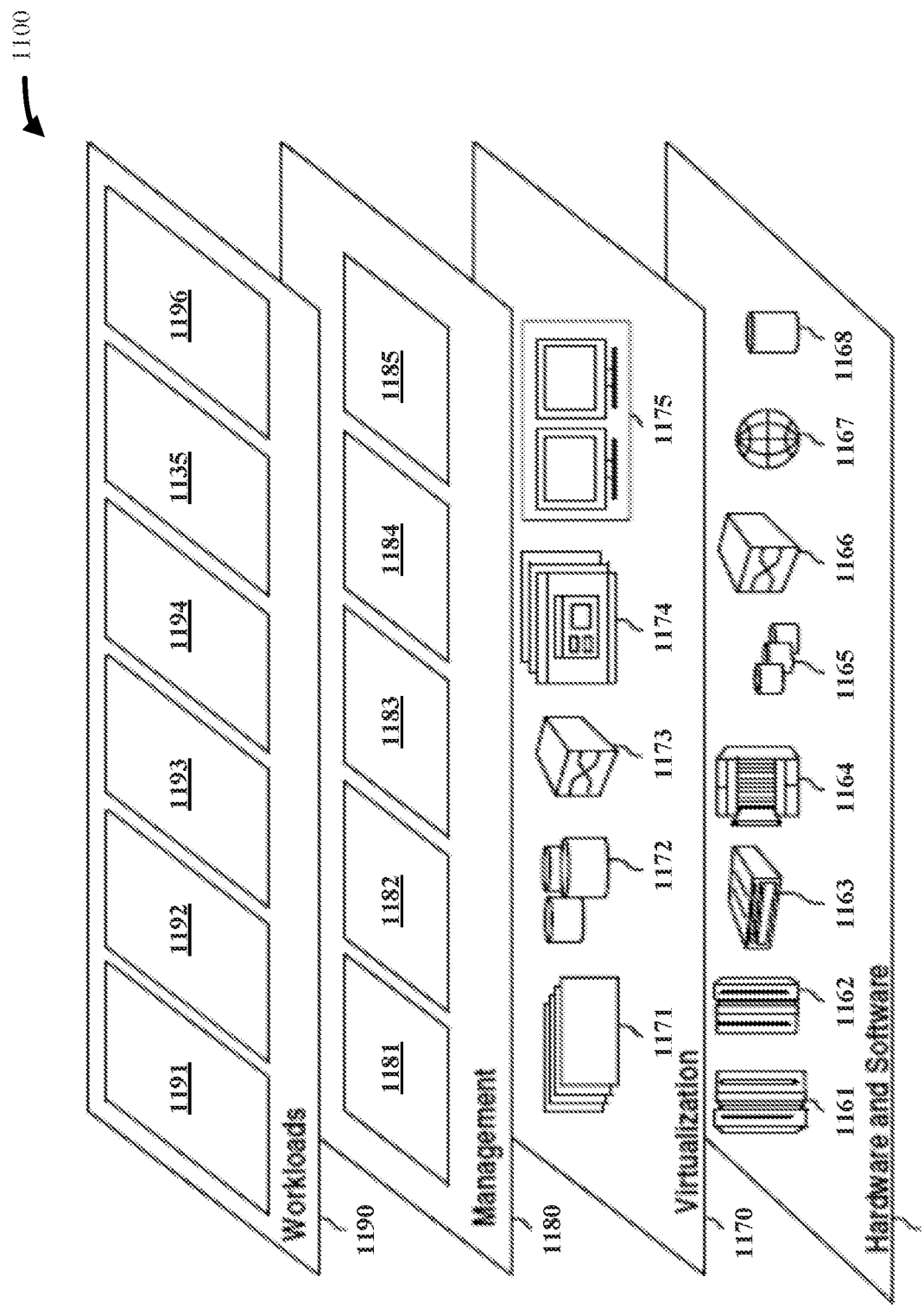
FIG. 11 illustrates a block diagram of a plurality of example, non-limiting abstraction model layers, in accordance with one or more embodiments described herein.

Referring now to FIG. 11, a set of functional abstraction layers is shown, such as provided by cloud computing environment 1050 (FIG. 10). It should be understood in advance that the components, layers and functions shown in FIG. 11 are intended to be illustrative only and embodiments described herein are not limited thereto. As depicted, the following layers and corresponding functions are provided:

Hardware and software layer 1160 can include hardware and software components. Examples of hardware components include: mainframes 1161; RISC (Reduced Instruction Set Computer) architecture-based servers 1162; servers 1163; blade servers 1164; storage devices 1165; and networks and networking components 1166. In one or more embodiments, software components can include network application server software 1167, quantum platform routing software 1168 and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and/or operating systems 1174; and/or virtual clients 1175.

In one example, management layer 1180 can provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1183 can provide access to the cloud computing environment for consumers and system administrators. Service level management 1184 can provide cloud computing resource allocation and management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment can be utilized. Non-limiting examples of workloads and functions which can be provided from this layer include: mapping and navigation 1191; software development and lifecycle management 1192; virtual classroom education delivery 1193; data analytics processing 1194; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++, or the like, and/or procedural programming languages, such as the "C" programming language or similar programming languages. The computer readable program instructions can execute entirely on the user's computer, partly on the user's computer, as a stand-alone software package, partly on the user's computer and/or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, and/or other device to cause a series of operational acts to be performed on the computer, other programmable apparatus or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to various embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions and/or acts or carry out combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems and/or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a determination component that determines that a primary electronic message has not received a response electronic message;
   an analysis component that generates a generated electronic message addressing the informational or emotional content of the primary electronic message; and
   a classification component that selects between two different types of messages, wherein the two different types of messages between which the classification component selects are emotional support seeking messages and informational support seeking messages and wherein the classification component classifies the primary electronic message as one of the two types of messages based on the selection by the classification component of the primary electronic message being one of the two types and not the other of the two types.

2. The system of claim 1,
   wherein the analysis component further applies an analytical model to the primary electronic message to analyze content of the primary electronic message.

3. The system of claim 1,
   wherein the determination component further labels the primary electronic message as an overlooked message based on the determination; and
   wherein the analysis component performs the analysis of the primary electronic message based on the label of the primary electronic message as an overlooked message.

4. The system of claim 1, wherein the computer executable components further comprise:
   an updating component that updates the analytical model based on one or more feedbacks to the generated electronic message, wherein the analytical model remains active while being updated.

5. The system of claim 4,
   wherein the one or more feedbacks comprise a feedback from an entity-in-the-loop monitoring outputs of the analytical model including the generated electronic message.

6. The system of claim 4,
   wherein the one or more feedbacks comprise a response electronic message posted, or uploaded, subsequent to the determination by the determination component.

7. A computer-implemented method, comprising:
   determining, by a system operatively coupled to a processor, that a primary electronic message has not received a response electronic message;
   generating, by the system, a generated electronic message addressing the informational or emotional content of the primary electronic message;
   selecting, by the system, between two different types of messages, wherein the two different types of messages between which the selection is performed are emotional support seeking messages and informational support seeking messages; and
   classifying, by the system, the primary electronic message as either an emotional support seeking message and not an informational support seeking message or an informational support seeking message and not an emotional support seeking message.

8. The computer-implemented method of claim 7, further comprising:
   applying, by the system, an analytical model to the primary electronic message to analyze content of the primary electronic message.

9. The computer-implemented method of claim 7, further comprising:
labeling, by the system, the primary electronic message as an overlooked message based on the determination; and
performing, by the system, the analysis of the primary electronic message based on the label of the primary electronic message as an overlooked message.

10. The computer-implemented method of claim 7, further comprising:
updating, by the system, the analytical model based on one or more feedbacks to the generated electronic message, wherein the analytical model remains active while being updated.

11. The computer-implemented method of claim 10, wherein the one or more feedbacks comprise a feedback from an entity-in-the-loop monitoring outputs of the analytical model including the generated electronic message.

12. The computer-implemented method of claim 10, wherein the one or more feedbacks comprise a response electronic message posted, or uploaded, subsequent to the determination by the determination component.

13. A computer program product facilitating a process to identify and respond to a primary electronic message, the computer program product comprising a computer readable storage medium having program instructions embodied therewith, the program instructions executable by a processor to cause the processor to:
determine, by the processor, that a primary electronic message has not received a response electronic message;
generate, by the processor, a generated electronic message addressing the informational or emotional content of the primary electronic message;
select, by the processor, between two different types of messages, wherein the two different types of messages between which the selection is performed are emotional support seeking messages and informational support seeking messages; and
classify, by the processor, the primary electronic message as either an emotional support seeking message and not an informational support seeking message or an informational support seeking message and not an emotional support seeking message.

14. The computer program product of claim 13, wherein the program instructions are further executable by the processor to:
apply, by the processor, an analytical model to the primary electronic message to analyze content of the primary electronic message.

15. The computer program product of claim 13, wherein the program instructions are further executable by the processor to:
labeling, by the processor, the primary electronic message as an overlooked message based on the determination; and
perform, by the processor, the analysis of the primary electronic message based on the label of the primary electronic message as an overlooked message.

16. The computer program product of claim 13,
update, by the processor, the analytical model based on one or more feedbacks to the generated electronic message, wherein the analytical model remains active while being updated.

17. The computer program product of claim 16, wherein the one or more feedbacks comprise a feedback from an entity-int-the-loop monitoring outputs of the analytical model including the generated electronic message.

18. The computer program product of claim 16, wherein the one or more feedbacks comprise a response electronic message posted, or uploaded, subsequent to the determination by the determination component.

19. A system, comprising:
a memory that stores computer executable components; and
a processor that executes the computer executable components stored in the memory, wherein the computer executable components comprise:
a determination component that determines that a primary electronic message has not received a response electronic message;
an analysis component that generates a generated electronic message addressing the content of the primary electronic message; and
a monitoring component that enables entity-in-the-loop feedback to the generated electronic message, wherein the entity-in-the-loop feedback results causes a denial of the generated electronic message.

20. The system of claim 19, wherein the computer executable components further comprise:
an updating component that updates an analytical model in response to the entity-in-the-loop feedback, wherein the analytical model remains active while being updated.

21. A system, comprising:
a memory that stores computer executable components; and
a processor that executes the computer executable components stored in the memory, wherein the computer executable components comprise:
a determination component that determines that a primary electronic message has not received a response message; and
an updating component that updates an analytical model at least partially in response to entity-in-the-loop feedback applied to a generated electronic message in response to the primary electronic message, wherein the updating component further updates the analytical model at least partially in response to a response electronic message uploaded subsequent to the determination by the determination component.

* * * * *